(12) United States Patent
LaPierre et al.

(10) Patent No.: US 6,348,278 B1
(45) Date of Patent: Feb. 19, 2002

(54) METHOD AND SYSTEM FOR SUPPLYING HYDROGEN FOR USE IN FUEL CELLS

(75) Inventors: Rene B. LaPierre, Medford; Randall D. Partridge, Haddonfield, both of NJ (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/323,293

(22) Filed: Jun. 1, 1999

Related U.S. Application Data

(60) Provisional application No. 60/088,627, filed on Jun. 9, 1998.

(51) Int. Cl.$^7$ .......................... H01M 8/04; H01M 8/18; C01G 49/02; B01J 8/04

(52) U.S. Cl. .................. 429/17; 422/196; 422/197; 422/198; 423/650; 423/652; 429/19

(58) Field of Search ................................. 423/652, 650; 422/196, 197, 198; 48/127.1, 127.3, 127.7, 127.9; 429/17, 19

(56) References Cited

U.S. PATENT DOCUMENTS

| | | | |
|---|---|---|---|
| 4,976,747 A | * 12/1990 | Szydlowski et al. | ....... 48/127.9 |
| 4,981,676 A | * 1/1991 | Minet et al. | ................ 423/652 |
| 5,686,196 A | 11/1997 | Singh et al. | .................. 429/17 |
| 5,741,474 A | 4/1998 | Isomura et al. | .......... 423/648.1 |
| 5,746,985 A | 5/1998 | Takahashi | ................... 422/173 |
| 5,861,137 A | 1/1999 | Edlund | ....................... 423/652 |
| 5,938,800 A | 8/1999 | Verrill et al. | ............... 48/127.9 |
| 5,958,091 A | * 9/1999 | Sakai et al. | ................. 48/127.9 |
| 6,063,515 A | * 5/2000 | Epp et al. | ..................... 429/17 |

OTHER PUBLICATIONS

Armor, J.N., "Membrane Catalysis: Where is it now, what needs to be done?", *Catalysis Today*, 1995, 25, 199–207.

Hayes, R.E. et al., *Introduction to Catalytic Combustion*, Gordon and Breach Science Publishers, 1997, 40–47.

Ioannides, T. et al., "Catalytic partial oxidation of methane in a novel heat–integrated wall reactor," *Catalysis Letters*, 1997, 47, 183–188.

Jørgensen, S.L. et al., "Steam Reforming of Methane in a Membrane Reactor", *Catalysis Today*, 1995, 25, 303–307.

Kochloefl, K., "Steam Reforming", *Handbook of Heterogeneous Catalysis*, 1997, Ertl, G. et al. (eds.), 3.2–3.3, 1819–1843.

(List continued on next page.)

*Primary Examiner*—Wayne Langel
(74) *Attorney, Agent, or Firm*—Paul E. Purwin

(57) ABSTRACT

The present invention provides a method and system for efficiently producing hydrogen that can be supplied to a fuel cell. The method and system of the present invention produces hydrogen in a reforming reactor using a hydrocarbon stream and water vapor stream as reactants. The hydrogen produced is purified in a hydrogen separating membrane to form a retentate stream and purified hydrogen stream. The purified hydrogen can then be fed to a fuel cell where electrical energy is produced and a fuel cell exhaust stream containing water vapor and oxygen depleted air is emitted. In one embodiment of the present invention, a means and method is provided for recycling a portion of the retentate stream to the reforming reactor for increased hydrogen yields. In another embodiment, a combustor is provided for combusting a second portion of the retentate stream to provide heat to the reforming reaction or other reactants. In a preferred embodiment, the combustion is carried out in the presence of at least a portion of the oxygen depleted air stream from the fuel cell. Thus, the system and method of the present invention advantageously uses products generated from the system to enhance the overall efficiency of the system.

18 Claims, 11 Drawing Sheets

OTHER PUBLICATIONS

Kumar, R. et al., "Design, Integration, and Trade–off Analysis of Gasoline–Fueled PEM Fuel Cell Systems for Transportation," *Fuel Cell Seminar Abstracts*, 1998, Nov. 16–19, 1998, Palm Springs, USA, pp. 226–229.

Mulder, M., *Basic Principles of Membrane Technology*, Chapter VI, Kluwer Academic Publishers, 1996, 394–396 and 474–479.

Ross, J.R.H. et al., "Catalysis With Membranes or Catalytic Membranes?" *Catalysis Today*, 1995, 25, 291–301.

Rostrup–Nielson, J., "Catalytic Steam Reforming," *Catalysis Science and Technology*, Springer–Verlag–Pub., Anderson, J.R. et al. (eds.), 1984, vol. 5, Ch. 1, 54–67.

Rostrup–Nielson, J. et al., "Steam Reforming Opportunities and Limits of the Technology," *Chemical Reactor Technology for Environmentally Save Reactors and Products*, de Lasa, H.J. et al. (eds.), Kluwer Academic Publishers, 1993, 249–281.

Stevens, P., "All You Wanted to Know About Fuel cells But Are Afraid to Ask", *Commercializing Fuel Cell Vehicles 97*, Intertech Conferences, presented in conference in Moret Sur Loing Cedex, France on Oct. 20, 1997, 1–62.

* cited by examiner

METHOD AND SYSTEM FOR SUPPLYING HYDROGEN FOR USE IN FUEL CELLS

CROSS-REFERENCE TO RELATED APPLICATIONS

This application claims the benefit of U.S. Provisional Application No. 60/088,627, filed on Jun. 9, 1998, the disclosure of which is hereby incorporated by reference in its entirety.

FIELD OF THE INVENTION

The present invention relates to a method and system of supplying hydrogen for use in a fuel cell. The system and method produces hydrogen by a reforming reaction of a hydrocarbon stream, and is particularly useful for supplying hydrogen to vehicles and stationary structures that use fuel cells.

BACKGROUND OF THE INVENTION

Recently there have been efforts to develop systems for supplying hydrogen to fuel cells that are used in such applications as vehicles, such as cars and buses, or stationary structures such as industrial plants. One such type of system that has been proposed obtains hydrogen from a reforming reaction of hydrocarbons or oxygen containing hydrocarbons. The hydrogen produced is purified in a hydrogen membrane separator before being used in the fuel cell.

The major reactions that occur in reforming can be represented by the following equations:

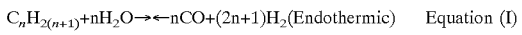

$$C_nH_{2(n+1)} + nH_2O \rightleftarrows nCO + (2n+1)H_2 \text{(Endothermic)} \quad \text{Equation (I)}$$

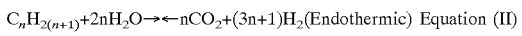

$$C_nH_{2(n+1)} + 2nH_2O \rightleftarrows nCO_2 + (3n+1)H_2 \text{(Endothermic)} \quad \text{Equation (II)}$$

$$CO + H_2O \rightleftarrows CO_2 + H_2 (-41 \text{ kJ/mole}) \quad \text{Equation (III)}$$

The reactions are equilibrium reactions and therefore, the amount of hydrogen produced from the hydrocarbon depends upon the reactions conditions, such as concentration of reactants, temperature, and pressure. For example, high concentrations of carbon dioxide consumes hydrogen to produce hydrocarbons such as methane (Equation II) and carbon monoxide (Equation III). However, increasing the amount of water drives the reactions to produce hydrogen. Therefore, efforts have focused on maximizing hydrogen production in these equilibrium reactions. Also, the reactions as written (from left to right) of Equations I and II are highly endothermic, requiring heat to drive the reactions, while the water gas shift reaction of Equation III is only slightly exothermic. Thus another effort has been to find efficient ways of supplying heat to the reforming reaction.

Once the hydrogen is produced, it typically is purified to remove such by-products as carbon monoxide to prevent poisoning of the catalyst coated electrodes (such as platinum coated electrodes) in the fuel cell. This purification may be performed using a hydrogen membrane separator. The membrane is typically a film or material that selectively allows hydrogen to pass through. The inlet side of the membrane, hereinafter called the "retentate side" is typically at a higher pressure than the outlet side, hereinafter called the "permeate side." The pressure difference between the permeate side and retentate side helps to drive the separation of the hydrogen. Suitable membranes include for example thin tubes or foils of palladium and alloys of palladium with silver or copper. The purified hydrogen leaving the membrane (hereinafter called the "hydrogen permeate" is fed to the fuel cell, while the material that did not pass through the membrane, hereinafter "retentate" is combusted to provide process heat.

There are various types of fuel cells that use hydrogen including for example alkaline fuel cells, polymer electrolyte fuel cells, phosphoric acid fuel cells, molten carbonate fuel cells, and solid oxide fuel cells. For fuel cells used in vehicles, polymer electrolyte fuel cells are most preferred.

In a polymer electrolyte fuel cell, purified hydrogen is fed to an anode side of the fuel cell where the hydrogen is split to form two hydrogen ions and two electrons. The hydrogen ions travel from the anode to the cathode by passing through a hydrated solid electrolyte that is continuously moistened with water. The electrons pass from the anode to the cathode by passing through an external circuit to supply electrical power. At the cathode, the hydrogen ions and electrons are reacted with oxygen in the air to form a fuel cell exhaust stream containing water vapor and oxygen depleted air.

The systems thus far proposed for supplying hydrogen to a fuel cell have been sub-optimal. For example, one problem has been finding efficient ways to supply heat for starting-up and maintaining the reforming reaction which is endothermic. U.S. Pat. No. 5,741,474 to Isomura et at., (hereinafter "Isomura") and U.S. Pat. No. 5,746,985 to Takahashi, (hereinafter "Takahashi") disclose systems for producing high purity hydrogen by reforming a hydrocarbon and/or an oxygen atom-containing hydrocarbon in the presence of steam to form a reformed gas containing hydrogen. The reformed gas is passed through a hydrogen membrane separator to be purified. To provide heat for the reforming reaction, Isomura and Takahashi teach that oxygen or air can be fed to the reforming reaction, in addition to the steam and hydrocarbon source, to carry out a partial oxidation reaction simultaneously with the reforming reaction. The partial oxidation is exothermic and supplies heat to maintain the reforming reaction. Isomura additionally teaches that the retentate from the hydrogen membrane separator can be combusted to supply heat for heating and vaporizing the reactants. Takahashi teaches that electrical resistors can be embedded in the catalyst to assist in starting-up and maintaining the reforming reaction. However, the systems of Isomura and Takahashi are sub-optimal in that gases formed or present during the partial oxidation reaction, such as nitrogen from the air, dilute the reformate, thereby reducing the effectiveness of the hydrogen recovery.

Additionally, the products produced, in addition to the hydrogen, have not been efficiently utilized in the system. For example, in Isomura, the steam-oxygen depleted gas mixture emitted from the fuel cell is condensed to remove the water. The oxygen depleted gas is simply discharged, while the water is re-circulated to moisten the purified hydrogen entering the fuel cell. Although the products from the fuel cell and their energy are partially used, more efficient uses of the products could be made.

U.S. Pat. No. 5,686,196 to Singh et al. (hereinafter "Singh") discloses a system for operating a solid oxide fuel cell generator using diesel fuel. The reformer produces hydrogen from the reforming reaction of desulfurized diesel fuel. The hydrogen produced is separated from the other reforming reaction products and is sent to a hydrogen storage device or is mixed with the diesel fuel prior to desulfurization. The remaining reaction products from the reforming reaction are fed to a solid oxide fuel cell where water generated from the operation of the fuel cell is recycled back to the reforming reactor. The system in Singh, although recycling some streams, is also sub-optimal in that the reactant by-products produced in the system could be used more efficiently to supply heat and energy to other system members.

Thus, there is a need in the art for a method and system, based on the reforming of hydrocarbons, for efficiently supplying hydrogen to a fuel cell. Particularly, there is a need to more efficiently use the products, heat, or energy generated in the reforming reaction and fuel cell to operate the system. There is also a need to optimize the yields of hydrogen obtained from the reforming reaction while maintaining energy efficiency of the system. There is also a need in the art for an improved method of starting-up the reforming reaction. The present invention seeks to solve these and other needs in the art.

SUMMARY OF INVENTION

The present invention provides an efficient method and system, based on the reforming of hydrocarbons, for producing hydrogen for use in a fuel cell system. The method and system of the present invention uses the products and the associated energy and/or heat produced from the system to operate the system. The method of the present invention includes feeding a hydrocarbon stream and water stream into a reforming reaction zone where the hydrocarbon stream and water stream are vaporized prior to or upon entering the reforming reaction zone of a reactor having a reforming catalyst; reacting the vaporized hydrocarbon stream and water stream in the reforming reaction zone at a temperature of at least about 200° C. and a pressure of at least 100 kPa to produce a gaseous reformate stream containing hydrogen; and feeding the gaseous reformate stream into a hydrogen separating membrane to form a purified hydrogen stream and a retentate stream. The method also includes forming a retentate recycle stream and an exhaust tail gas stream from the retentate stream in proportions to provide a retentate recycle ratio of about 20:1 to about 1:20; and recycling the retentate recycle stream to the reforming reaction zone and directing the exhaust tail gas stream to a combustor. The method further includes oxidizing the exhaust tail gas stream in the combustor in the presence of oxygen to form a combustion gas stream and heat, and transferring at least a portion of the heat formed to the reforming reaction zone, the hydrocarbon stream, the water stream, or the retentate recycle stream, or combinations thereof.

The system of the present invention includes a reforming reactor having an inlet, an outlet, a reforming reaction zone, and a reforming catalyst located in the reforming reaction zone. The system also includes a hydrogen separating membrane for separating from the reformate stream a purified hydrogen stream and a retentate stream where the membrane has an inlet in flow communication with the outlet of the reforming reactor, a retentate side, and a permeate side. The system also includes a retentate recycle means for forming the retentate stream into a retentate recycle stream and an exhaust tail gas stream and for directing the retentate recycle stream to the reforming reaction zone. The system further includes a combustor having an inlet and an outlet, and capable of combusting the exhaust tail gas stream to generate heat and a combustion gas stream; and heat transfer means for transferring at least a portion of the heat formed in the combustor to the reforming reaction zone, the hydrocarbon stream, the water stream, or the retentate recycle stream or combinations thereof.

The present invention also provides a method of starting-up a reforming reactor used to supply hydrogen to a fuel cell. The method of starting-up the reforming reactor includes combusting a first portion of a hydrocarbon stream in the presence of an oxygen containing stream to generate heat and to form a starting combustion gas stream containing water vapor; feeding at least a portion of the starting combustion gas stream and a second portion of a hydrocarbon stream into a reforming reaction zone of a reactor; and reacting the hydrocarbon stream, and the water vapor to form hydrogen, where at least a portion of the hydrocarbon stream is vaporized from the heat generated in the combustion. The method also includes heating the reaction zone to at least a temperature of 200° C. and a pressure of at least 100 kPa; and ceasing flow of the starting combustion gas stream into the reforming reaction zone.

In a preferred embodiment of the present invention a method and means is provided for using oxygen depleted air emitted from the fuel cell as an oxygen source for oxidizing the exhaust tail gas stream. Catalytic combustion when using this oxygen depleted air is particularly preferred.

DETAILED DESCRIPTION OF THE INVENTION

The present invention relates to an integrated and energy efficient system and method for producing and supplying hydrogen produced in a reforming reaction to a fuel cell. The system and method of the present invention advantageously uses the products emitted from the reforming reactor and fuel cell to supply heat and/or energy to other system members. The system of the present invention includes a reforming reactor, a hydrogen separating membrane, a fuel cell, a combustor, and retentate recycle means. The system is operated by providing a vaporized hydrocarbon stream and vaporized water stream (e.g., steam) in the reforming reaction zone of the reforming reactor and catalytically reacting the hydrocarbon stream to form a reformats stream containing hydrogen. This reformate stream is then fed into the hydrogen separating membrane to form a purified hydrogen stream and retentate stream. Preferably, at least a portion of the purified hydrogen stream, along with sufficient air, are fed to the fuel cell to supply power and to produce a fuel cell exhaust stream containing water vapor and oxygen depleted air. The combustor oxidizes a portion of the retentate stream in the presence of oxygen to generate heat and energy for operating the system. The retentate stream and the fuel cell exhaust stream can also be used in other ways as detailed hereinafter to improve the overall efficiency of the system.

Figure 1:
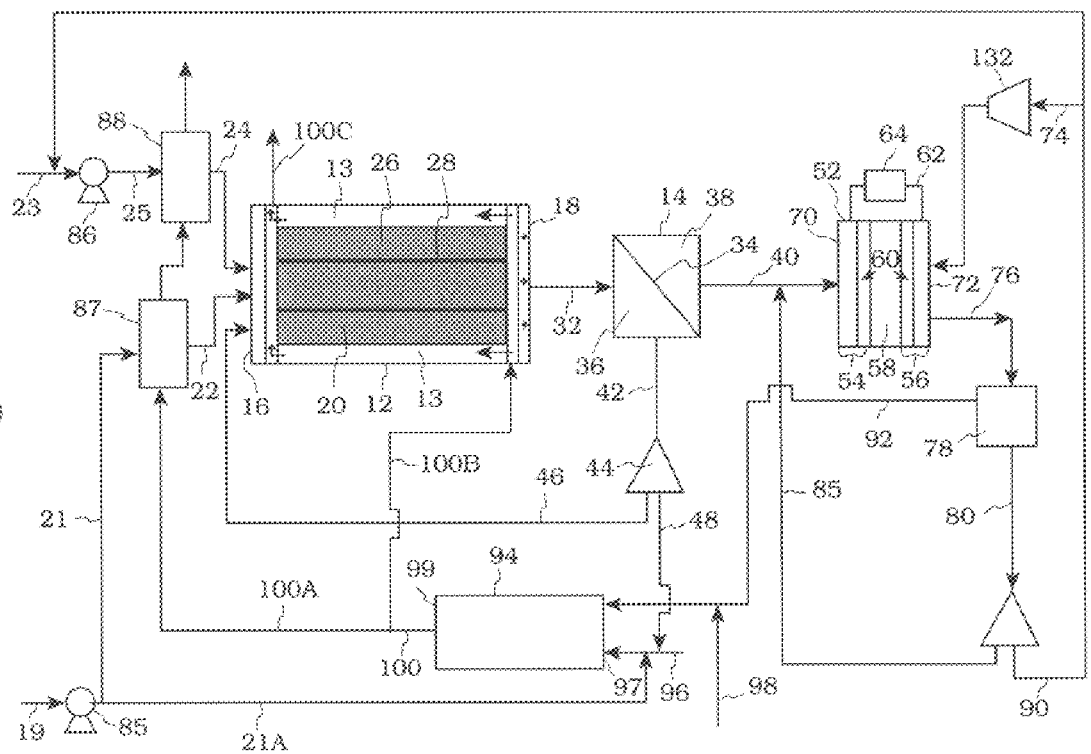
FIG. 1 is a schematic representation of an integrated system of the present invention for supplying hydrogen to a fuel cell.

Now referring to the Figures, where like numerals represent like elements, FIG. 1 shows a schematic representation of an embodiment of an integrated fuel cell system 10 of the present invention for producing and supplying hydrogen to a fuel cell. By "integrated", it is meant that at least a portion of the products and/or energy generated from the system is recycled back to the system for a more efficient operation. The fuel cell integrated system 10 includes a reforming reactor 12, a hydrogen separating membrane 14, a fuel cell 52, and a combustor 94. The reforming reactor 12 has an inlet 16, an outlet 18, and a reforming reaction zone 20 where a hydrocarbon stream 21 is catalytically reformed with a water stream 25. The reforming reaction zone 20 as shown in FIG. 1 includes for example a washcoated monolithic matrix 26, used as a support for a steam reforming catalyst (not shown).

Although FIG. 1, uses a washcoated monolithic matrix as a support for the steam reforming catalyst, there are various other types of catalytic supports (used with or without a mechanical support such as the monolithic matrix) that may be used. Any type of catalytic support may be chosen that does not impart a large pressure drop (e.g., greater than about 50 kPa to about 200 kPa) across the reactor length. For example, pellets or beads may also be used as a catalytic support. Preferably however, the catalytic support is in the form of a monolith structure as shown in FIG. 1.

Catalytic supports may be formed from various materials including for example inorganic oxides, such as alumina, silica, titania, zirconia, magnesium aluminate, ceria modified aluminates, or lanthana modified aluminates, or combinations thereof. The catalytic support may also be formed from related naturally occurring minerals or suitably modified minerals such as clays. Preferably, the catalytic support is composed of alumina, magnesium aluminate, ceria modified aluminates, or lanthana modified aluminates, or combinations thereof.

Suitable reforming catalysts include any catalyst that can effectively promote the reformation reaction. Preferred reforming catalysts are not susceptible to poisoning under reforming reaction conditions and are tolerant of temperature changes that occur for example during start-up of the integrated fuel cell system. The reforming catalyst is also preferably resistant to coking. Suitable reforming catalysts include for example supported noble metals or nickel-based catalysts, or combinations thereof. Preferred reforming catalysts are based on noble metals, with platinum, palladium, rhodium, ruthenium or combinations thereof being most preferred. It is also possible to vary the composition of the catalyst along the length of the reactor to enhance the yield of hydrogen. The amount of catalyst used on the catalytic support is preferably from about 0.01 g to about 30 g of active metal catalyst per liter of reactor volume and more preferably from about 0.1 g to about 5 g of active metal catalyst per liter of reactor volume.

One skilled in the art will recognize that there are various other types of catalysts suitable for steam reforming hydrocarbons. Other suitable reforming catalysts are disclosed in for example J. Rostrup-Nielson, "Catalytic Steam Reforming," *Catalysis Science and Technology*, Springer-Verlag-Pub., J. R. Anderson and M. Boudart-Ed. (1984); J. Rostrup-Nielson, et al *Chemical Reactor Technology for Environmentally Save Reactors and Products*, p. 249–281, Kluwer Academic Publishers (1993); and K. Kochloefl, *Steam Reforming*, p. 1819–1843; the disclosures of which are all hereby incorporated by reference in their entireties.

The reforming reactor 12 also has heating means for supplying heat directly to the reforming reactor 12. The heating means may be for example, devices that are electrically heated and in contact with the reforming reaction zone 20, or one or more conduits located adjacent to or within the reforming reaction zone that transfer heat from a heating fluid to the reforming reaction zone, or combinations thereof. The reforming reactor in FIG. 1 has electrically heated plates 28, and a conduit 13, surrounding the reforming reaction that receives a combusted gas stream 100B. Although the combusted gas stream 100B is sent through the conduit 13 counter-currently to the reactants, the combusted gas stream 100B could also be sent through the conduit 13 co-currently, or cross-currently, or combinations thereof.

The reforming reactor in FIG. 1 is preferably operated by pressurizing the hydrocarbon stream 19 and externally supplied water stream 23 using liquid pumps 85 and 86 respectively. The pressurized hydrocarbon stream 21 and water stream 25 are then vaporized in vaporizers 87 and 88 respectively to form the vaporized hydrocarbon stream 22 and water vapor stream 24. The hydrocarbon stream 19 and water stream 23 are preferably vaporized to a temperature that is below or at the operating reforming reaction temperatures in the reforming reaction zone 20. The hydrocarbon stream 19 and water stream 23 are preferably pressurized to the operating reforming reaction pressures in the reforming reaction zone 20.

One skilled in the art will recognize that there are various ways to provide a vaporized and pressurized hydrocarbon stream 19 and water stream 23 to the reforming reaction zone. Any method may be used as long as the hydrocarbon stream and water stream are pressurized and vaporized to operating temperatures and pressures upon entering the reforming reaction zone 20. For example, it may be desired to atomize the pressurized hydrocarbon stream 19 as it enters the reforming reactor 12 to facilitate vaporization of the hydrocarbon stream 19 prior to or upon just entering the reforming reaction zone 20. In such an embodiment, it may be desired to preheat the hydrocarbon stream 19 to facilitate vaporization once introduced into the reforming reactor 12. It may also be desired to atomize the hydrocarbon stream 19 and/or water stream 25 at the inlets of vaporizers 87 and 88 to facilitate vaporization.

The vaporized hydrocarbon stream 22 and the water vapor stream 24 are fed into the reforming reaction zone 20 where they are catalytically reacted to form a gaseous reformate stream 32. Preferably the operating reforming reaction temperature in the reforming reaction zone is at least about 200° C., more preferably from about 400° C. to about 800° C., and most preferably from about 600° C. to about 700° C. The operating reforming reaction pressure in the reaction zone is preferably at least about 100 kPa, more preferably from about 500 kPa to about 3500 kPa and most preferably from about 1000 kPa to 2000 kPa. The reforming reaction (after steady state is reached) is preferably conducted in an atmosphere substantially free of oxygen and nitrogen (e.g., about less than 0.10 mole percent total oxygen and nitrogen, based on all vapors and gases in the reforming reaction zone).

The hydrocarbon stream 19 preferably contains one or more hydrocarbons or oxygenated hydrocarbons. Suitable hydrocarbons or oxygenated hydrocarbons include for example $C_1$ to $C_{20}$ alkanes, alkanols, aromatics or arylalkanes, or combinations thereof. Preferred hydrocarbons or oxygenated hydrocarbons include naphthas, gasolines, and distillate fuels derived from petroleum sources that can be supplied using the existing fuel supply system for vehicle fuels. More preferred hydrocarbons or oxygenated hydrocarbons are multipurpose fuels such as hydrogen rich isoparaffinic fuels such as alkylates that are substantially free of sulfur compounds, have high octane ratings, and are useful in both fuel cell vehicles and in conventional internal combustion engine vehicles.

The amount of water vapor (e.g., steam) used to reform the hydrocarbon stream depends upon such parameters as the type of hydrocarbon feed being reformed and the reaction conditions. For example, hydrocarbons typically used as fuel for internal combustion engines such as gasoline require more water vapor for reforming in comparison to methane or methanol. This is because fuels, such as gasoline (e.g., higher hydrocarbon chain length), contain a lower ratio of hydrogen to carbon in comparison to methane or methanol, and thus require more water vapor for the reforming reaction. In addition to considering the type of hydrocarbon feed, the desired degree of conversion affects the amount of water vapor fed to the reforming reactor. For example, as the steam partial pressure is increased in the reforming reactor, both the steam reforming reactions of Equations I and II, and the water gas shift reaction of Equation III favors the production of hydrogen. Increasing the steam partial pressure in the reactor also desirably minimizes coking reactions.

The steam to feed carbon mole ratio is generally used as a measure of the desired amount of steam to be used in the reforming reaction. In determining this ratio, the "steam" is the total moles of steam (including recycle) fed to the reforming reactor and the "feed carbon" is the total moles of carbon fed to the reforming reaction zone, including carbon sourced from the hydrocarbon feed, and carbon present in the recycle streams such as carbon dioxide, carbon monoxide, and partially converted hydrocarbon. Generally, steam to feed carbon ratios of from about 1.5:1 to about 10:1 may be used, with steam to feed carbon ratios of from about 2.5:1 to about 5:1 being preferred. The preferred steam to feed carbon ratios have been selected because steam to feed carbon ratios of less than about 2.5:1 can lead to carbon formation, while ratios greater than about 5:1 substantially dilute the reformate, requiring excessively large heat exchangers and increased membrane area, resulting in increased costs. Steam to feed carbon ratios of 2.5:1 to 3:1 are especially preferred when reforming methane in a membrane reforming reactor system, such as disclosed in Peterson, et. al., Catalysis Today 46, pp. 193–201 (1998), which is hereby incorporated by reference in its entirety.

In a preferred embodiment of the present invention as described in greater detail hereinafter, it is preferred to recycle both steam and hydrogen to the reforming reactor inlet. The presence of recycled hydrogen at the reactor inlet reduces coke formation and allows lower steam to feed carbon ratios in comparison to when using steam alone.

The rate of total feed fed to the reforming reaction zone is preferably in an amount to provide gas hourly space velocities ranging from about 500 $hr^{-1}$ to about 500,000 $hr^{-1}$ (STP 0°C., 760 mm Hg). Most preferred feed rates are from about 5000 $hr^{-1}$ to about 50,000 $hr^{-1}$ based on STP ideal gas volume of the total feed fed per hour per reactor volume. Lower rates are anticipated during idling periods. By "total feed" it is meant all feeds fed to the reforming reaction zone such as the hydrocarbon stream, the water vapor stream, and any recycle streams.

The composition of the reformate stream 32 exiting the reforming reactor will depend on the reforming reaction conditions such as the steam to feed carbon ratio, and the concentration of recycled components, such as carbon dioxide, fed into the reforming reaction zone. Preferably, the reformate stream contains from about 1 to about 75 mole percent hydrogen, from about 10 to about 25 mole percent carbon dioxide, from about 1 to about 60 mole percent water vapor, and from about 0.1 to about 5 mole percent carbon monoxide. An example of a typical reformate stream composition when steam reforming gasoline using the methods and systems of the present invention may have a composition containing nominally about 20 mole % hydrogen, about 23 mole % carbon dioxide, about 4 mole % carbon monoxide, and about 6 mole % methane, with the balance being primarily water vapor.

The gaseous reformate stream 32 is then fed to the hydrogen separating membrane 14 that has a membrane 34 that divides the reformate stream 32 into a retentate side 36 and a permeate side 38. The membrane 34 is chosen so that substantially only hydrogen passes through the membrane 34 to the permeate side 38 leaving the remaining components on the retentate side 36 of the hydrogen separating membrane 14. The hydrogen leaves the permeate side 38 of the membrane as a purified hydrogen stream 40 that contains preferably less than 10,000 ppm impurities, more preferably less than 50 ppm impurities and most preferably less than 10 ppm impurities (based on total volume of the purified hydrogen stream). By "impurities" it is meant substances that adversely affect the performance of the fuel cell such as carbon monoxide. The portion of the reformate stream 32 remaining on the retentate side 36 leaves the hydrogen separating membrane 14 as a retentate stream 42 that contains water vapor, carbon dioxide, methane, carbon monoxide, and possibly unreacted or partially reacted hydrocarbons. The hydrogen separating membrane 14 is preferably operated to have a hydrogen partial pressure difference across the membrane of at least 10 kPa and most preferably from about 50 to 500 kPa to maintain an adequate flow of hydrogen from the reforming reactor.

Any hydrogen separating membrane may be used that is effective in separating hydrogen from the other reaction products in the reformate stream. Preferably, the hydrogen separating membrane is selected from palladium, or alloys of palladium with silver and/or copper, or combinations thereof. In a most preferred embodiment, the hydrogen separating membrane is formed from palladium-copper alloys having from about 35 weight percent to about 45 weight percent copper. Other suitable hydrogen separating membranes are disclosed in for example Catalysis Today, Vol. 25, p. 199–207 (1995), which is hereby incorporated by reference in its entirety.

The purified hydrogen stream 40 from the hydrogen separating membrane 14 is directed into fuel cell 52 that in FIG. 1 is a polymer electrolyte type fuel cell. The fuel cell 52 has an anode 54, a cathode 56, a membrane 58 and an electrical carrying conduit 62. Each electrode is coated with a catalyst 60 such as platinum. The purified hydrogen stream 40 enters an anode side 70 of the fuel cell and is split to form hydrogen ions and electrons. The electrons are transmitted through the electrical conduit 62 to supply load 64 with electricity, while the hydrogen ions pass through the membrane 58 to the cathode 56. At the cathode side 72 of the fuel cell 52, the hydrogen ions are reacted with an air stream 74, supplied by a blower compressor 132, to form a fuel cell exhaust stream 76 containing water vapor and oxygen depleted air. The fuel cell exhaust stream is then directed into a condenser 78 to condense the water vapor and to separate the condensed water vapor (hereinafter referred to as "fuel cell water stream 80") from the oxygen depleted air 92.

The fuel cell integrated system 10 efficiently uses the heat and energy from various product streams to efficiently produce hydrogen. For example, in a preferred embodiment, as shown in FIG. 1, the fuel cell integrated system 10 has a retentate recycle means that includes a splitter 44, for removing at least a portion of the retentate stream 42 as a retentate recycle stream 46 and recycling it to the reforming reactor 12. Another portion of the retentate stream 42 is shown as an exhaust tail gas stream 48 that is preferably oxidized in a combustor 94 (described hereinafter). It will be apparent to those skilled in the art that any suitable means for recycling the retentate stream may be used that removes a portion of the retentate stream for recycle and directs the retentate recycle to the reforming reactor. It is also desirable that the retentate recycle means be capable of operating at the temperatures and pressures of the reforming reactor. Suitable retentate recycle means include for example, a splitter used in conjunction with, but not limited to, a turbine or other type of compression pump.

By recycling a portion of the retentate stream to the reforming reactor higher yields of hydrogen per mole of hydrocarbon reacted can be achieved. For example, thermodynamic calculations suggest that recycling a portion of the retentate stream 42 shifts the equilibrium of Equations (I, II, and III) to produce more hydrogen. This results because the retentate stream 42 contains primarily water vapor and is partially depleted of hydrogen, thereby reducing the concentration of hydrogen and increasing the concentration of water vapor in the reforming reaction zone. This shift in hydrogen and water vapor concentrations in the reforming reaction zone drives the reaction equilibriums to produce more hydrogen, and less methane and carbon monoxide. Although the retentate stream 42 also contains carbon dioxide, the level of carbon dioxide does not outweigh the effect of the additional water vapor to drive the production of hydrogen.

In addition to shifting the equilibrium reaction towards the production of more hydrogen, the higher flow rates through the reactor with recycle lead to improved mixing which results in a more uniform temperature distribution and better contacting of the reactants with the catalyst. Recycle also desirably introduces hydrogen at the inlet of the reforming reactor thereby reducing coking (deposition of carbon) on the catalyst. An additional advantage to recycling the retentate stream 42 is that the external requirements for water are reduced, allowing the reforming reactor to be efficiently operated at lower steam to feed carbon ratios.

Preferably the retentate recycle ratio, expressed as the moles of retentate recycle stream 46 to the moles of exhaust tail gas stream 48 is preferably from about 1:20 to about 20:1, more preferably from about 1:1 to about 10:1, and most preferably from about 2:1 to about 5:1. By recycling a portion of the retentate stream 42, the yields of hydrogen, on a molar basis, can be increased by at least 10% more preferably 50% and most preferably 100% based on the yield of hydrogen obtained with no recycle of the retentate stream 42. Although it would be expected that a higher retentate recycle ratio would produce the highest yield of hydrogen and would therefore be most desirable, it has been discovered that for an overall energy efficient system, it is most desirable to not recycle all of the retentate stream to the reforming reactor. Rather, it is desirable to direct at least a portion of the retentate stream to combustor 94 to supply heat to the reforming reactor, the hydrocarbon feed, the water stream, or retentate recycle stream, or combinations thereof. Additionally, in the case where the reforming reactor is operated at a higher temperature than the hydrogen separating membrane, which could be limited by the physical characteristics of the membrane, increasing the retentate recycle stream, increases the amount of heat needed to bring the retentate recycle stream up to operating temperatures of the reforming reactor. Thus, the preferred amount of retentate stream recycled above needs to take into account a variety of factors.

In another preferred embodiment shown in FIG. 1, a portion of the retentate stream 42 is fed to an inlet side 97 of combustor 94 as an exhaust tail gas stream 48, where it is combusted to form a combusted gas stream 100 containing heat. The combusted gas stream 100 exits the outlet side 99 of the combustor 94 and is transferred to heat and/or vaporize the water stream 25, the hydrocarbon stream 21, the retentate recycle stream 46, other reactant streams not shown, or to supply heat to the reforming reaction, or combinations thereof. In FIG. 1, a portion of the combusted gas stream 100A is passed through vaporizers 87 and 88 to heat and vaporize the hydrocarbon stream 21 and water stream 25 respectively. A second portion of the combusted gas stream 100B is passed through conduit 13 of the reforming reactor to heat the reforming reaction and exits as combusted gas stream 100C. Combusted gas stream 100C may also optionally be directed into vaporizers 87 and/or 88, or used to heat other streams.

The combustion reaction is preferably accomplished as follows. The combustion of the exhaust tail gas stream, 48 is carried out in the presence of an oxygen containing stream such as an air stream 98, an oxygen depleted air stream 92 from the fuel cell 52, or combinations thereof. The oxygen depleted air stream 92, provided by the fuel cell 52 exhaust, preferably contains from about 8 mole percent to about 14 mole percent oxygen, although fuel cell exhaust streams having higher levels of oxygen can be used. The use of an oxygen depleted air stream 92 from the fuel cell 52 is preferred in operating the combustor 94 as the combustion can be controlled more readily resulting in lower combustion temperatures. By lowering combustion temperatures, the combustor 94 can be constructed of less expensive materials and can be operated more safely. Using the oxygen depleted air stream 92 from the fuel cell also provides other system efficiencies. For example, the fuel cell 52 typically needs excess air (more than the stoichiometric amount needed to react with the hydrogen ions) to obtain efficient oxygen transport within the fuel cell. This excess air is efficiently used by directing the air emitted from the fuel cell to the combustor. Additionally, the use of the oxygen depleted air stream 92 from the fuel cell 52 advantageously eliminates the need for additional air compression equipment, that would deplete additional energy from the fuel cell 52, to supply air to the combustor 94.

Supplemental fuel 96 may also optionally be supplied to the combustor 94. In a preferred embodiment the supplemental fuel is obtained from a portion of stream 21A of hydrocarbon stream 19.

Preferably, the oxygen containing stream (e.g., oxygen depleted air stream 92 or air stream 98) is fed in at least the stoichiometric amount to completely combust (i.e., complete conversion to carbon dioxide and water) the exhaust tail gas stream and any other combustibles that may be fed to the combustor 94. Preferably, the oxygen containing air stream is fed in an amount to provide from about 2 to about 20 mole percent excess oxygen, and more preferably from about 5 to about 10 mole percent excess oxygen for completely combusting all combustibles (e.g., hydrocarbons, carbon monoxide, and hydrogen) fed to the combustor 94.

In embodiments of the present invention where all the oxygen containing stream fed to the combustor 94 is obtained from oxygen depleted air stream 92, the overall amount of air stream 74 fed to the fuel cell 52 can be set by determining the appropriate molar ratio of air stream 74 to the total hydrocarbon feed fed to the system (e.g., hydrocarbon stream 19). Although the desired molar ratio will depend on such factors as the type of hydrocarbon feed selected, preferably, the molar ratio of air stream 74 to total hydrocarbon feed is from about 7.2:1 to about 126:1, and more preferably from about 40:1 to about 80:1. Preferably, the molar ratio of air stream 74 to hydrocarbon feed is selected so that the system operates from about 50% to about 150%, and more preferably at about 100% excess oxygen based on the total amount of oxygen needed to convert all hydrogen in the fuel cell feed (purified hydrogen stream 40) to water.

Supplemental hydrocarbon fuel 96 is introduced to the combustor during startup and under load conditions requiring rapid heating. Maintaining the overall air stream 74 to total hydrocarbon feed molar ratio as noted above results in most efficient operation of both the combustor 94 and the fuel cell 52.

The combustor 94 may be any device capable of combusting or oxidizing the exhaust tail gas stream 48. The combustion is preferably carried out at a temperature of from about 200° C. to about 1400° C. and more preferably at a temperature of from about 400° C. to about 800° C. to supply the combusted gas stream at a temperature of from about 300° C. to about 800° C. and more preferably from about 600° C. to about 750° C. The pressure within the combustor is preferably from about 100 kPa to about 500 kPa and more preferably from about 150 kPa to about 300 kPa.

In a preferred embodiment, the combustion is carried out in the presence of an oxidation catalyst. The oxidation catalyst used may be any oxidation catalyst suitable for combusting the exhaust tail gas stream 48 within the desired combustion temperatures and pressures. Preferably the oxidation catalyst is tolerant of varying amounts of combustible components in the exhaust tail gas stream that results in fluctuations of temperature within the combustor. Preferred catalysts are similar to those used in automotive exhaust catalysts containing noble metals, such as platinum/palladium. Palladium containing catalysts are most preferred as they are known to limit combustion temperatures by change of oxidation state at excessively high temperatures. Suitable combustion catalysts are disclosed in for example R. E. Hayes and S. T. Kolaczkwoski, *Introduction to Catalytic Combustion,* Gordon and Breach Science Publishers, 1997, pp. 40 to 46, which is hereby incorporated by reference in its entirety.

In another preferred embodiment of the present invention, at least a portion of the condensed fuel cell water 80 is recycled to the reforming reactor as a reforming water recycle stream 90. Although FIG. 1 shows the reforming water recycle stream 90 being combined with the externally supplied water 23 prior to pressurization and vaporization, one skilled in the art will recognize that there are various ways to add the reforming water recycle stream to the reforming reactor. Another portion of fuel cell water 80 can be directed back to the fuel cell as a fuel cell water recycle stream 85 to moisten purified hydrogen stream 40 or to directly moisten the membrane 58 of the fuel cell 52 (not shown).

Recycling fuel cell water 80 to the reforming reactor advantageously reduces the external requirements for water, thereby reducing the size, weight and complexity of the water recovery and improving energy efficiency. This is particularly important when reforming hydrocarbons to produce hydrogen, because hydrocarbons typically require twice as much water vapor stoichiometrically in comparison to oxygen containing hydrocarbons such as methanol. If recycling of the fuel cell water is desired, preferably at least 10 weight percent, more preferably at least 25 weight percent, and most preferably at least 50 weight percent of the total weight of the fuel cell water 80 generated from the fuel cell 52 is recycled to the reforming reactor.

Additionally, the portion of water vapor fed to the reforming reactor which is sourced from the fuel cell water 80 is preferably from about 10 to about 90, and more preferably from about 40 to about 60 weight percent of the total water vapor 24 fed to the reforming reactor.

Figure 2:
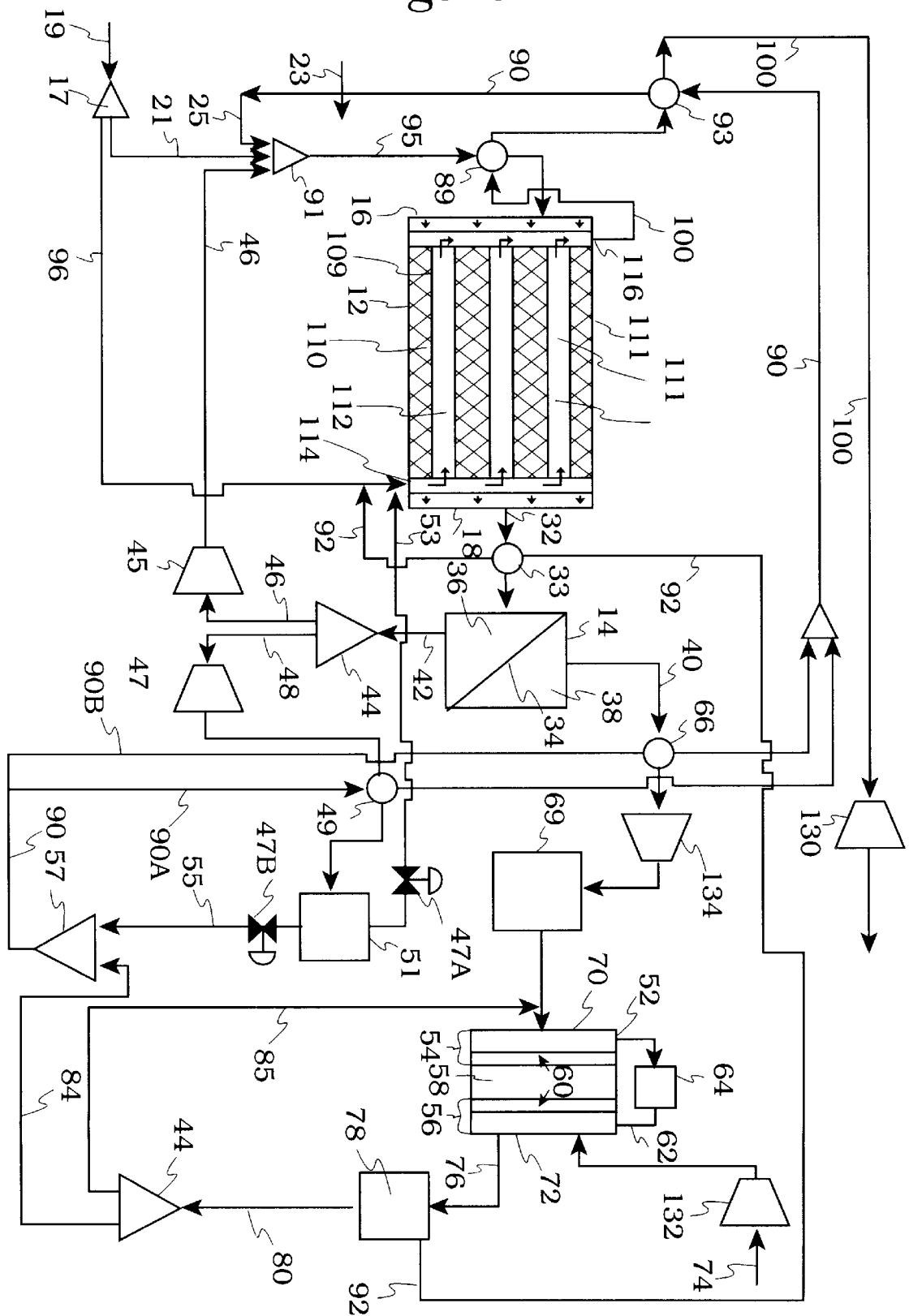
FIG. 2 is another schematic representation of an integrated system of the present invention for supplying hydrogen to a fuel cell where the reforming reactor has a combustor located within the reforming reaction zone.

Now referring to FIG. 2, FIG. 2 shows another preferred fuel cell integrated system 10 of the present invention for supplying hydrogen to a fuel cell. Instead of an external combustor 94 as shown in FIG. 1, the reforming reactor in FIG. 2 has an internal combustor 110. The internal combustor 110 includes one or more combustion conduits 112 that provide one or more combustion zones 122; an inlet 114 in flow communication with the combustion conduits 112 for receiving the exhaust tail gas stream 48 and the depleted oxygen air stream 92; and an outlet 116, also in flow communication with the combustion conduits 112 for exhausting the combustion gas stream 100. The combustion conduits 112 are disposed within or adjacent to the reforming reaction zone to transfer heat to the reforming reaction.

The conduits preferably contain an oxidation catalyst (not shown) which promotes oxidation of the exhaust tail gas stream 48. Preferably, the oxidation catalyst is coated on the inside surface 109 of the conduits. The oxidation catalyst can be any suitable oxidation catalyst such as those described for use with the external catalytic combustor. A preferred oxidation catalyst contains palladium. The external surface 111 of the conduit is preferably coated with a reforming catalyst (not shown).

The combustion reactants fed into the conduits 112 in FIG. 2 are fed countercurrently to the direction of the reforming reactants. It is also possible however, to feed the combustion reactants in other directions such as co-currently or cross-currently (perpendicular to the flow of the reforming reactor reactants), or combinations thereof, to the reforming reactor reactants. A most preferred embodiment provides for catalytic combustion and catalytic reforming on opposite walls of the noted conduits. See also T. Ioannides and X. Verykios, Catalysis Letters 47, pp. 183–188, (1997), the disclosure of which is hereby incorporated by reference in its entirety, for other examples of carrying out combustion and reforming reactions in separate conduits.

In the operation of the reforming reactor 12 having an internal combustor 110, the combustion is preferably carried out just below the operating pressure of the fuel cell 52. This pressure is preferably from about 100 kPa to about 300 kPa. The reforming reaction is preferably under a higher pressure compared to the operating pressure of the internal combustor, such as from about 500 kPa to about 3000 kPa, and more preferably from about 1000 kPa to about 2000 kPa. Preferably, the reforming reactor is designed so that the walls of conduits 112 are as thin as possible to obtain maximum heat transfer between conduits 112 and the reforming reaction zone 20. One of ordinary skill in the art will be able to design appropriate conduits when considering such factors as the desired operating temperatures and pressure differentials described above.

The reforming reactor having an internal combustor may be constructed in various ways to provide conduits within or adjacent to the reforming reaction zone. The conduits may be of any shape such as cylindrical or rectangular, and may be prepared from various materials having one or more surfaces to form one or more combustion zones that are separate from, but located adjacent to or within the reforming reaction zone. The combustion conduits are preferably prepared of a material having high thermal conductivity such as stainless steel, aluminized stainless steel, or other suitable metal alloys, so that the heat generated during combustion is transferred with minimal resistance to the reforming reaction zone. For example, the reforming reactor and internal combustor may include one or more tubes internally disposed within a shell. This embodiment is shown in FIG. 2. In this embodiment, preferably the ratio of the inner tube diameter to the inner shell diameter is from about 0.001:1 to about 0.1:1. Also preferably the spacing, or pitch, between the inner tubes is preferably from about 1.1 to about 2.0 times the tube diameters, when measured from the center of adjacent tubes.

Figure 3:
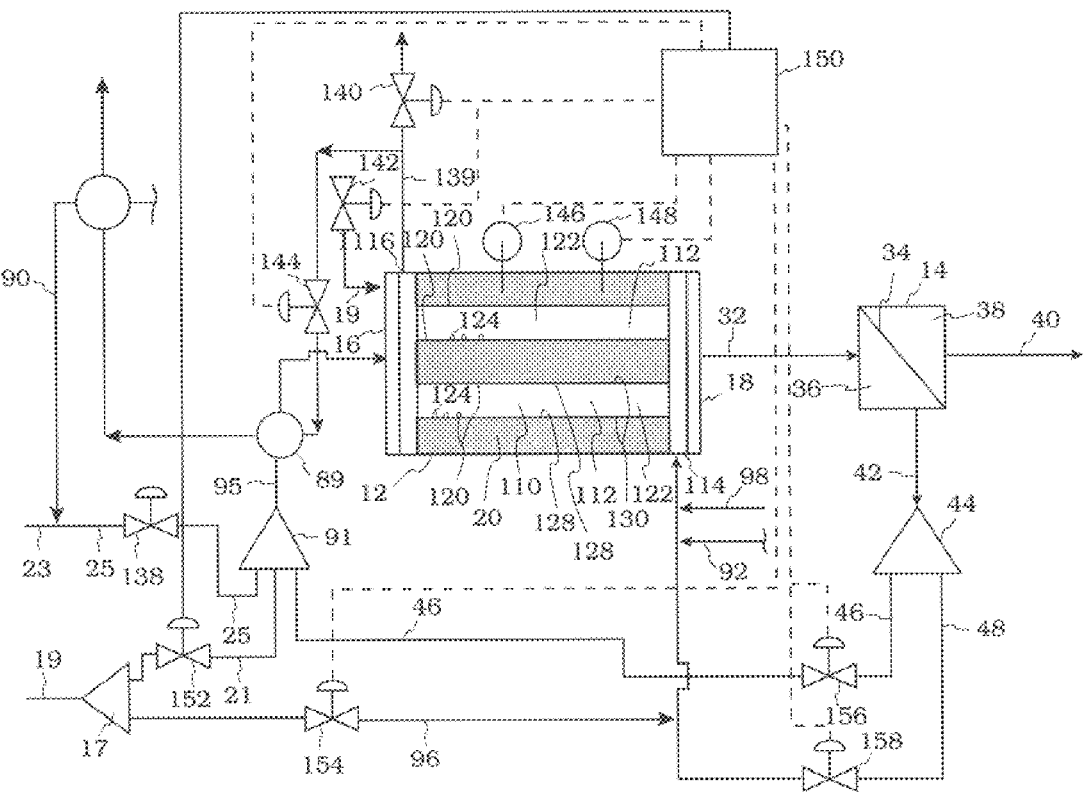
FIG. 3 is a schematic representation of a portion of an integrated system of the present invention that is preferred for starting-up the reforming reactor.

The reforming reactor 12 with an internal combustor 110 may also have aplate and frame construction as shown in FIG. 3. In this embodiment, the combustion conduits 112 are formed by plates 120 that separate reforming reaction zone 20 from combustion zones 122. The internal surfaces 128 of the plates 120 are preferably coated with an oxidation catalyst 124 for combusting gases in the combustion zones 122, while the external surfaces 130 of the plates 120 are coated with a reforming catalyst (not shown). The plates 120 or portions thereof can also be electrically conducting to supply additional heat to the reforming reaction zone.

Referring to FIG. 2 again, some other preferred embodiments of the integrated system will now be described. A preferred reactant feed system is shown in FIG. 2 that uses a feed splitter 17 and feed mixer 91. The hydrocarbon feed 19 is preferably divided with splitter 17 into at least two feeds. The first feed exiting feed splitter 17 is the hydrocarbon stream 21 that is fed into the reforming reaction, while the second feed exiting feed splitter 17 is the supplemental fuel stream 96 that is fed into the combustor 110. The hydrocarbon stream 21 is combined in feed mixer 91 with the retentate recycle stream 46 and the water stream 25 to form combined feed 95. This combined feed 95 is then heated and vaporized in vaporizer 89 using the heat from combustion gas stream 100.

The reformate stream 32 exiting the reforming reactor 12 is preferably passed through a heat exchanger 33 to cool the reformate stream 32 to a temperature that is compatible with the hydrogen separating membrane 14. With palladium type hydrogen separating membranes, the reformate stream is preferably cooled to a temperature of from about 300° C. to about 450° C. However, one skilled in the art will recognize that the reformate stream 32 may not need to be cooled depending on the hydrogen separating membrane.

The purified hydrogen stream 40 exiting the permeate side 38 of the hydrogen separating membrane 14 is preferably directed into a heat exchanger 66 to cool the hydrogen to a temperature that is compatible with the operation of the fuel cell 52. Preferably, the purified hydrogen stream 40 is cooled to a temperature of at least about 90° C. or less and more preferably to at least about 80° C. or less in the case of a polymer electrolyte fuel cell. However, one skilled in the art will recognize that cooling may not be necessary if the fuel cell can operate at temperatures that the hydrogen separating membrane operates at.

In another preferred embodiment of the present invention, the purified hydrogen stream 40, instead of being fed directly into a fuel cell 52 as shown in FIG. 1, may also optionally be directed through a hydrogen compressor 134. The compressor can also serve to lower permeate hydrogen pressures and enhance membrane performance. A hydrogen storage device 69 serves to protect the fuel cell and provide a hydrogen buffer volume.

The retentate stream 42 exiting the retentate side 36 of the hydrogen separating membrane 14 is divided into a retentate recycle stream 46 and exhaust tail gas stream 48. The retentate recycle stream 46 is preferably passed through, for example, a recycle turbine 45 or other pressure increasing device to increase the pressure of the retentate recycle stream 46 to the operating pressure of the reforming reactor. The exhaust tail gas stream 48 is preferably passed through an exhaust turbine 47 or other similar pressure reducing device to decrease the pressure of the exhaust tail gas stream 48 to the operating pressure of the combustor. The exhaust tail gas stream 48 is also preferably passed through a heat exchanger 49 and exhaust tail gas process water condenser 51 for cooling the exhaust tail gas stream 48 and separating water in the exhaust tail gas stream 48 from the other gaseous components. The tail gas process water condenser 51 also preferably includes a condensate collection device (not shown), such as a "knock out pot," for collecting the condensate. The cooled, depressurized, and substantially water free exhaust tail gas stream 53 is fed into the internal combustor 110 where it is combusted as previously described. The exhaust tail gas process water 55 from condenser 51 may be recycled to the reforming reactor 12.

In a preferred embodiment, alternatively or in addition to exhaust turbine 47, the fuel cell integrated system 10 includes a back pressure control device 47A, such as a valve or regulator, that is preferably located downstream of the heat exchanger 49 and process water condenser 51. The fuel cell integrated system 10 also includes a liquid level control device 47B, such as an automatic valve to control the level of condensate in the liquid collection device of the condenser 51. The use of a back pressure control device results in being able to use a smaller and more efficient heat exchanger 49, and also results in increased recovery of the exhaust tail gas process water 55. Preferably, the back control pressure device maintains the pressure in exhaust tail gas stream during condensation at a pressure of about 100 kPa to about the operating reforming reaction pressure. In using back pressure control device 47A, water recovery is substantially increased, even at elevated temperatures (e.g., greater than about 80° C.) by condensation under pressure.

This in turn substantially improves the amount of exhaust tail gas process water 55 that is recovered and recycled. Additionally, operating the back pressure control device 47 at lower temperatures (e.g., less than about 250° C.) improves operability, and thereby the overall safety of the pressurized reactor.

The heat released in cooling the reformate stream 32, the purified hydrogen stream 40, the exhaust tail gas stream 48, or the heat generated from the combustion of the exhaust tail gas stream 48 or combinations thereof can be advantageously used to heat other streams as shown for example in FIG. 2. In FIG. 2, a preferred embodiment is shown where a portion 84 of fuel cell water 80 and exhaust tail gas process water 55 is recombined in unit 57 to form water recycle stream 90, and divided into two separate water streams 90A and 90B. Water stream 90A is passed through the exhaust tail gas heat exchanger 49 and water stream 90B is passed through hydrogen heat exchanger 66. The two water streams are then recombined again to form reforming water recycle stream 90 that is heated further with the combustion gas stream 100 in heat exchanger 93 before being fed into feed mixer 91 with external water stream 23. Alternatively, water recycle stream 90, instead of being divided into streams 90A and 90B, can be fed to heat exchangers 49 and 66 in series (not shown).

It is also preferable as shown in FIG. 2 to heat the depleted oxygen stream 92 before it is fed into the combustor 10. The oxygen depleted air stream 92 may be heated using the heat released, from the streams that are cooled in the fuel cell integrated system 10, as previously described or with the combustion gas stream 100, or combinations thereof. In FIG. 2, the oxygen depleted air stream 92 is heated with the reformate stream 32 using the reformate heat exchanger 33.

In addition to using the heat released in cooling streams and combusting the exhaust tail gas stream 48, it is possible to use the energy of expanding gases to operate other devices in the system such as turbines, pumps, or blowers. For example, the energy released in the exhaust tail gas turbine 47 may be used to operate for example the recycle turbine 45. Also, for example, the energy released in expanding the combustion gas stream 100 exiting the system via combustion gas exhaust expander 130 may be used to operate an air blower 132 that feeds air stream 74 into fuel cell 52. The energy from the combustion exhaust gas expander 130 could also be used to operate vacuum pumps. As shown in FIG. 2, in a preferred embodiment a hydrogen compressor 134 is used to increase the pressure difference between the reformate side 36 and permeate side 38 of the hydrogen separating membrane 14. The energy to operate this compressor 134 could be obtained from combustion gas exhaust expander 130.

Thus the integrated system of the present invention advantageously uses the heat and energy generated in the system to operate other members of the system. The hydrogen production efficiency of this integrated system (not including the efficiency of the fuel cell), expressed as the lower heating value (LHV) of the hydrogen consumed by the fuel cell (e.g., the hydrogen in the purified hydrogen stream in FIG. 1) divided by the LHV of the total hydrocarbon feed (e.g., hydrocarbon stream 19) fed to the system can exceed 70%, with recovery of water from the fuel cell and exhaust tail gas stream. Assuming that the fuel cell is about 50% efficient, the overall system efficiency, expressed as the net electrical power produced (i.e., 50% of the LHV of hydrogen consumed by the fuel cell, converted to electrical energy) divided by the LHV of the total hydrocarbon feed, can be about 30% to about 35% or even greater.

Preferably, the fuel cell integrated system of the present invention has an overall system efficiency that exceeds 30% to compete effectively with advanced gasoline and diesel internal combustion engines and ICE/Electric hybrids. Suitable methods for calculating fuel cell system efficiencies are described for example in R. Kumar, et. al. "Design, Integration, and Trade-off Analysis of Gasoline-Fueled PEM Fuel Cell Systems for Transportation", 1998 *Fuel Cell Seminar Abstracts,* Nov. 16–19, 1998 Palm Springs, USA, pp. 226–229, the disclosure of which is hereby incorporated by reference in its entirety.

The integrated system of the present invention is also particularly suited for starting-up the reforming reactor. As discussed previously, there have been difficulties in developing efficient methods for starting-up fuel cell systems. A preferred method for starting up the reforming reactor will now be described with reference to FIG. 3. However, it will be recognized that FIGS. 1 or 2 could be adapted to perform the following start-up.

In the start-up method of the present invention an oxygen containing stream, such as air stream 98, oxygen depleted air stream 92 from the fuel cell, or combinations thereof, and a fuel stream 96 are fed into the combustor inlet 114. Preferably the fuel stream 96 is either vaporized prior to being introduced into the combustor inlet 114 or atomized (not shown) at the combustor inlet. The oxygen containing stream is preferably fed to the combustor inlet 114 in an amount equal to or more preferably exceeding the stoichiometric amount of oxygen needed to completely combust (i.e., fully oxidize) fuel stream 96.

Preferably, the fuel stream 96 is the same as the hydrocarbon stream 21 that is fed into the reforming reactor, as shown in FIG. 3. However, it will be recognized that the fuel stream 96 may be any oxidizable hydrocarbon containing stream such as for example natural gas, oxygenated hydrocarbons, or hydrocarbons such as methane, propane, butane, pentane, naphtha, alkylate (2,2,4-trimethylpentane), or gasoline. The oxygen containing stream is preferably provided by the blower/compressor used to supply air to the fuel cell.

The fuel stream 96 is combusted in conduits 112, in the presence of the oxygen containing stream to form a starting combustion gas stream 139 containing water vapor, carbon dioxide, and optionally carbon monoxide and/or oxygen. Preferably, the mole percent of oxygen, carbon monoxide, water vapor, and carbon dioxide in the starting combustion gas stream 139 is from about 0 to about 5 percent oxygen; from 0 about to about 10 percent carbon monoxide; and from about 5 to about 20 percent water vapor; with the balance being carbon dioxide. The combustion is preferably performed at a temperature of about 200 ° C. to about 800° C. and a pressure of from about 100 kPa to about 500 kPa. The combustion is also preferably conducted in the presence of an oxidation catalyst. By operating under these conditions, the fuel is combusted to form primarily carbon dioxide and water vapor.

The resulting starting combustion gas stream 139 is exhausted through combustor outlet 116, and directed through the reforming reaction inlet 16 to the reforming reaction zone by closing control valve 140 and opening control valve 142. A portion of the starting combustion gas stream 139 is also preferably fed through vaporizer 89 to heat and/or vaporize hydrocarbon stream 21 through opening control valve 144. The hydrocarbon stream 21 is co-fed with the starting combustion gas stream 139 into the reforming reaction zone 20. Preferably, the hydrocarbon stream 21 is supplied to the reforming reactor at a temperature of at least 20° C. and more preferably at a temperature of from about 100° C. to about 400° C. If the hydrocarbon stream 21 is in liquid form upon reaching the reforming reactor 112, preferably the hydrocarbon stream 21 is atomized at the reforming reactor inlet 16 to facilitate vaporization. Preferably, the hydrocarbon stream 21 is fed to the reforming reactor 112 at a pressure of at least 100 kpa and more preferably at a pressure of from about 100 kPa to about 300 kPa. The molar ratio of hydrocarbon stream 21 fed into the reforming reactor to the hydrocarbon in fuel stream 96 fed to the combustor is preferably from about 0 to about 0.50 and more preferably from about 0.10 to about 0.40 at startup. It is also possible to feed supplemental water vapor into the reactor for example by atomizing water stream 25 in vaporizer 89. Preferably, during start-up the overall molar ratio of water vapor fed to the system to carbon from the total hydrocarbon fed to the system (hydrocarbon stream 21 and fuel stream 96) is from about 1.5:1 to about 10:1 and more preferably from about 2:1 to about 5:1.

As the temperature and pressure increases in the reforming reaction zone, some hydrogen begins to be made. The resulting gaseous reformate stream 32 is passed through the hydrogen separating membrane 14 to form a retentate stream 42 and a purified hydrogen stream 40. The retentate stream 42 is recycled to either the combustor inlet 114 or reformer inlet 16. Preferably, from about 10 to about 90 mole percent and more preferably from about 50 to about 80 mole percent of the retentate stream 42 is recycled to the combustor inlet 114, and from about 10 to about 90 mole percent and more preferably from about 20 to about 50 mole percent of the retentate stream 42 is recycled to the reformer inlet 16 during start-up. As the temperature and pressure increases in the reforming reactor, less retentate is recycled to the combustor inlet and more to the reforming inlet to approach the preferred retentate recycle ratios of the retentate recycle stream 46 to the exhaust tail gas stream 48 as described previously herein during normal operation.

The feeds of combustion gas stream 139, hydrocarbon stream 21, retentate recycle stream 46 are preferably continued until the reforming reaction zone reaches the desired operating reforming temperatures and pressures, as previously described.

Once reforming operating temperatures and pressures are reached in the reforming reaction zone, a feed of water stream 25 is started or increased by opening control valve 138, and the flow of starting combustion gas stream 139 through the reforming reactor 12 is ceased through closing control valve 142. The combustion gas stream may then be used as previously described to heat other streams or the reforming reaction as previously described. It may also be desirable as the reforming reaction approaches reforming operating conditions to gradually begin or increase the flow of water stream 25 that is vaporized, and to gradually cease the flow of the starting combustion gas stream 139 to the reforming reaction zone.

The opening and closing of the control valves during start-up is preferably controlled using a control system. An example of a control system is shown in FIG. 3. Controller 150 receives temperature and pressure signals from indicators 146 and 148 respectively, and in response to the temperature and pressure signals, the controller can adjust the flow rate of starting combustion gas stream 139 entering the reforming reactor 12 via control valves 140, 142, and 144. The controller can also for example control the flow rate of hydrocarbon feed stream 21 and water stream 25 through the reactor via control valve 152 and 138 respectively. FIG. 3 also shows control valves 154,156 and 158 for controlling the flow rate of fuel stream 96, retentate recycle stream 46 and exhaust tail gas stream 48, respectively. The flow rate of other streams may also be controlled by means of the process controller.

EXAMPLES

Some embodiments of the present invention will now be described in detail in the following Examples. In all Examples "TMP" refers to 2,2,4-trimethyl pentane.

Example 1

A heat balance for the autothermal reforming of isooctane, also known as 2,2,4-trimethylpentane (TMP), was performed to estimate the potential for hydrogen production from gasoline for use in automotive fuel cell applications. TMP is a desirable, 100 octane rated, component found in commercial gasoline containing alkylates. A simple heat balanced model was constructed using a commercially obtained process simulation package, PRO/II steady state flow-sheeting and process optimization software by Simulation Sciences, Inc. located in Brea, Calif. In the absence of thermodynamic equilibrium constraints, the endothermic steam reforming of TMP can be written as follows:

TMP Reforming $C_8H_{18} + 16H_2O \rightleftharpoons 8CO_2 + 25H_2 +948$ kJ/mole $H_2$ Combustion (LHV) $H_2 + 0.5O_2 \rightleftharpoons H_2O(g)$ -242 kJ/mole Hydrogen combustion is extremely exothermic. Using the simulation software, the net heat balance for the autothermal reforming of TMP was calculated using enough moles of oxygen, sourced from air, for combusting that portion of the hydrogen to just meet the thermal duty requirements of the autothermal reforming reaction. The simulation further assumed that all products were cooled to 25° C. The net heat balanced (0 kJ/mole TMP) autothermal reaction obtained was:

$C_8H_{18}+10.0H_2O+3.0.O_2+11.32N_2=8CO_2+19.0H_2+11.32N_2$

Thus, each mole of TMP converted leads to a maximum of 19 moles of hydrogen. The efficiency for producing hydrogen for use in fuel cell vehicles (i.e., the hydrogen production efficiency) is generally presented as the lower heating value (LHV) of the hydrogen consumed in the fuel cell (−242 kJ/mole) divided by the LHV of the hydrocarbon feed processed (−5102 kJ/mole). Assuming 19 moles of hydrogen are consumed in the fuel cell per mole of TMP feed, the maximum hydrogen production efficiency for a fuel cell system is 90%.

Example 2

Figure 4A:
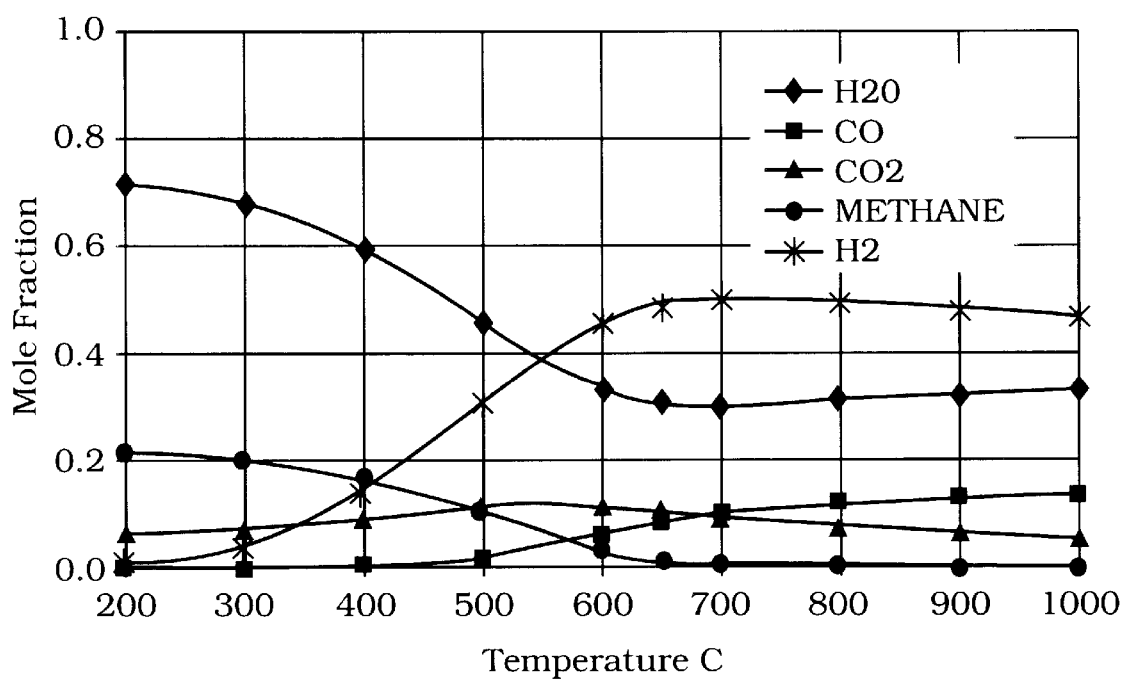
FIG. 4A is a graph showing the composition of a reformate stream (expressed as mole fraction) exiting a reforming reactor versus reforming reaction temperature (° C.) for a reforming reaction of isooctane (TMP) conducted at an operating reaction pressure of 100 kPa and assuming equilibrium conditions are reached in the reactor.
Figure 4B:
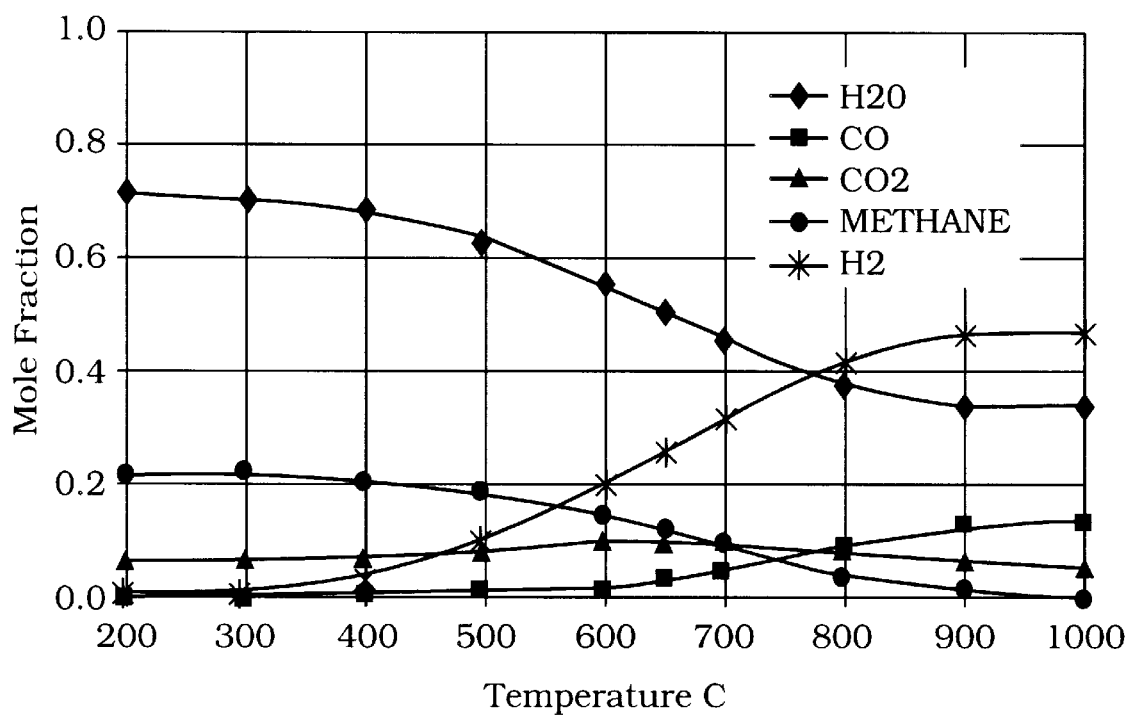
FIG. 4B is a graph showing the composition of a reformate stream (expressed as mole fraction) exiting a reforming reactor versus reforming reaction temperature (° C.) for a reforming reaction of isooctane (TMP) conducted at an operating reaction pressure of 2000 kPa and assuming equilibrium conditions are reached in the reactor.

Thermodynamic equilibria of the reforming reaction and the more practical aspects of heat recovery make the achievement of the hydrogen production efficiency noted in Example 1 extremely difficult. With respect to thermodynamic equilibria, hydrogen production during reforming is favored by increasing reaction temperatures and decreasing reaction pressures. For example, TMP reforming reaction simulations were run at various reaction temperatures and reaction pressures using the PRO/II steady state flow-sheeting and process optimization software (previously used in Example 1). The simulations assumed that thermodynamic equilibrium conditions were reached. FIGS. 4A and 4B show the results of the simulations at a steam to feed carbon ratio of 3:1. FIGS. 4A and 4B show the reformate stream composition (measured in mole fraction) exiting a reforming reactor at equilibrium versus temperature (in ° C.). In FIG. 4A, the reforming reaction pressure was set at 100 kPa and in FIG. 4B, the reforming reaction pressure was set at 2000 kPa in the simulation.

Example 3

A computer simulation of a reforming reaction was developed and run to demonstrate the benefits of recycling a portion of the retentate stream to the reforming reactor. The computer software package used to develop the computer simulation was the PRO/II steady state flow-sheeting and process optimization software previously described.

The simulation that was developed assumed that the reforming reactor was operated at equilibrium so that the Gibbs free energy of the system was zero. The simulation also assumed a reactor configuration similar to FIG. 1 where the reformate stream 32 exiting the reforming reactor 12 is directed to a hydrogen separating membrane 14 having a retentate side 36 and permeate side 38. The retentate stream 42 on the retentate side 36 of the hydrogen separating membrane 14 was assumed to be directed through a splitter 44 to recycle varying amounts of retentate stream (i.e., retentate recycle stream 46) to the reforming reactor. The simulation did not include a combustor or fuel cell as shown in FIG. 1. Thus, the only products exiting the reactor system were assumed to be a purified hydrogen stream (i.e., stream 40) and an exhaust tail gas stream (i.e., stream 48).

For reaction conditions in the reforming reactor, the simulation assumed that TMP was reformed with steam using a steam to feed carbon molar ratio of 2.5:1. The reactor was assumed to operate isothermally at 650° C. and at an outlet pressure of 800 kPa. Complete conversion of the TMP was assumed.

The hydrogen separating membrane was assumed to operate as follows. The pressure of the retentate side of the hydrogen separating membrane was assumed to be 800 kPa, while the pressure of the permeate side of the membrane was assumed to be 100 kPa. Hydrogen permeate rate was calculated in the simulation by assuming a hydrogen partial pressure differential of 50 kPa between the retentate side and permeate side. Additionally, the hydrogen pressure on the retentate side was set at 150 kPa.

The above simulation was run assuming a retentate recycle ratio of 0 (i.e., no recycle of retentate stream to the reforming reactor) and a retentate recycle ratio of 6:1 (i.e., 6 moles of retentate recycle stream per 1 mole of exhaust tail gas stream). The total amount of products exiting the reactor system (i.e, the exhaust tail gas stream and purified hydrogen stream) is shown below in Table 1:

TABLE 1

Equilibrium Recycle Reactor:
TMP, 650° C., 800 kPa, 2.5 Steam/Feed Carbon

| Products Exiting Reactor System | No Recycle moles/mole C in feed* | 6:1 Recycle moles/mole C in feed |
|---|---|---|
| Water | 1.50 | 1.10 |
| Carbon Monoxide | 0.185 | 0.206 |
| Carbon Dioxide | 0.407 | 0.594 |
| Methane | 0.408 | 0.197 |
| Hydrogen | 1.307 | 2.139 |

*total moles exiting reactor system per mole of carbon in the TMP Feed

The results shown in Table 1 clearly illustrate the benefits of recycling a portion of the retentate stream. With no recycle, the thermodynamic equilibrium favors the production of methane at the moderate reaction temperature chosen. For example, the data above shows that over 40% of the original carbon in the hydrocarbon feed could be converted to methane, thereby limiting hydrogen production. Recycle significantly increases hydrogen make, while dramatically reducing that of methane produced.

Example 4

Figure 8:
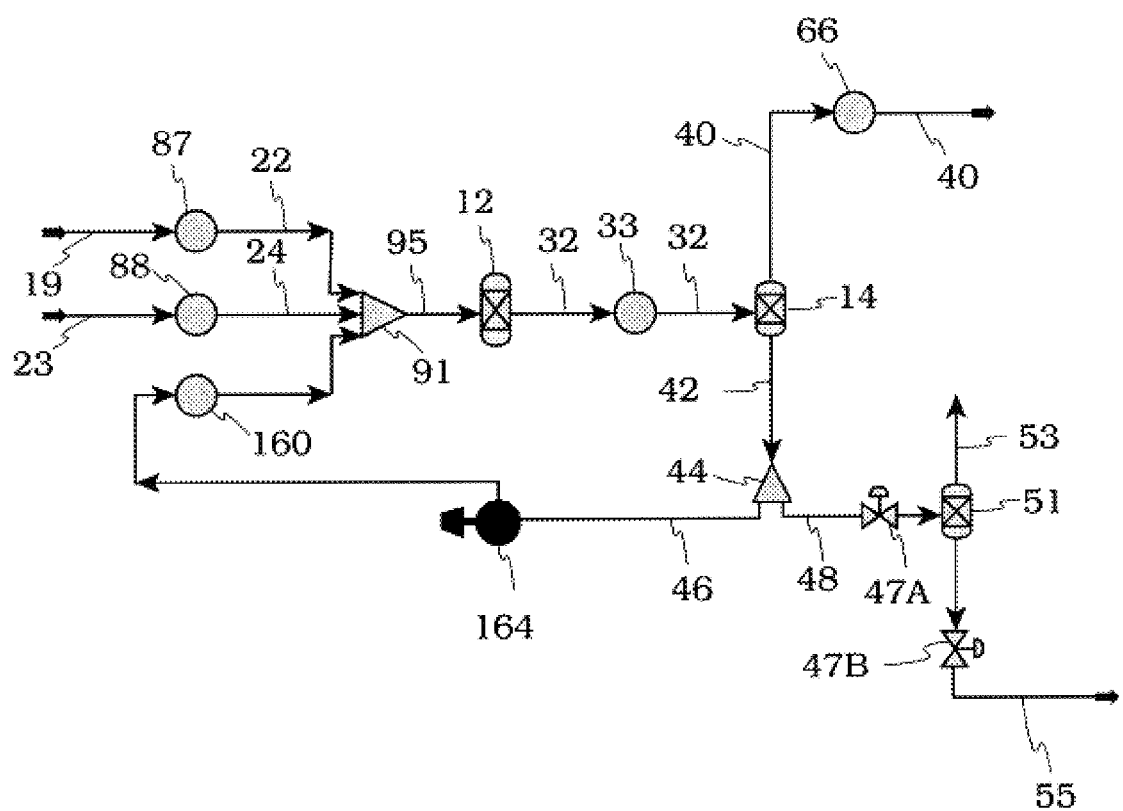
FIG. 8 is a schematic representation of a laboratory reforming reactor system used in Example 4.

A laboratory sized reforming reactor system was constructed to demonstrate the effectiveness of the present invention. A schematic representation of the reforming reactor system 9 is shown in FIG. 8. The system 9 included pumps (ISCO Model 500 D Syringe Pumps, not shown) for providing both water 23 and hydrocarbon feed 19 (2,2,4-trimethylpentane) to the reforming reactor 12, heated vaporizers 19, 23, and 160, and a heated stainless steel tubular reactor 12 packed with a granulated noble metal catalyst. The system also included a heated palladium-copper hydrogen separating membrane 14 (obtained from Northwest Power Systems, Inc., Bend, Oreg. 97702), a stainless steel diaphragm recycle pump 164 (Whitey Co., Highland Heights Ohio), a retentate back pressure regulator 47A, a permeate vacuum pump (not shown), and a condensor/product collection system 51. Gases, such as nitrogen for purging, and hydrogen were supplied by mass flow controllers (Model 5860E Brooks Instrument Div. Emerson Electric Co, Hatfield, Pa., not shown). Online gas analysis was obtained using a MTI Quad Refinery Gas Analyzer (Hewlett Packard/MTI Analytical Instruments). Gas rates were measured with wet test meters. The retentate recycle stream was mixed with fresh TMP feed prior to the vaporizer. The vacuum pump was operated to ensure maximum hydrogen flux through the membrane at the conditions noted.

The catalyst used in the reforming reactor was prepared by impregnating a pelleted and sized (20–40 mesh) precipitated magnesium aluminate with platinum tetraammine nitrate solution to obtain a final platinum loading of 2 weight percent based on the total weight of the catalyst system (catalyst and support) after air calcination at 350° C. The catalyst ( about 4 cc) was loaded in the stainless steel tubular reactor ( about 7.5 mm ID) and reduced in hydrogen at about 400° C. prior to use.

Reaction conditions were similar to those noted in Example 3. The reactor operating temperature was set at 650° C. and the reactor operating pressure was set at about 800 kPa. The water feed rate was adjusted to maintain a 2.5:1 steam to fresh feed carbon mole ratio. The liquid feed rate of TMP was set at about 8 cc per hour. These feed rates of TMP and steam combined equate to a gas hourly space velocity at standard temperature and pressure (STP GHSV) of about 5311 hr$^{-1}$. The retentate stream was recycled at a retentate recycle ratio ranging from about 6:1 to about 11:1. The hydrogen separating membrane temperature was controlled at 350° C.

Prior to the experiments with the reaction system, the performance of the Pd—Cu alloy hydrogen separating membrane was ascertained. The vacuum pump was operated at a pressure of less than 1 kPa to increase hydrogen permeation.

The reforming reactor system thus described was operated at various retentate recycle ratios to evaluate performance of the reforming reactor and the yield of hydrogen. At the conditions noted, TMP conversion was about 87% based on the fresh feed of TMP to the reactor. The results for the laboratory reforming reactor system operated at a retentate recycle ratio of 6:1 are shown in Table 2 in comparison to the computer simulation of Example 3 with no recycle. The results for the laboratory reforming reactor system operated at a retentate recycle ratio of 6:1 are shown in Table 3 in comparison to the computer simulation of Example 3 run at a retentate recycle ratio of 6:1.

TABLE 2

Laboratory Recycle Reactor: TMP, 650° C., 800 kPa, 2.5 Steam/Feed Carbon

| Composition of Products Exiting Reactor System**, Excluding Water | Computer Model No Recycle (mole %, dry basis) | Laboratory 6:1 Recycle (mole %, dry basis) |
|---|---|---|
| Carbon Monoxide | 8.0% | 2.0% |
| Carbon Dioxide | 17.6% | 20.7% |
| Methane | 17.7% | 2.0% |
| Hydrogen | 56.7% | 72.8% |

**Composition reported in Table 2 is the mole percentage of products by combining the exhaust tail gas stream and purified hydrogen stream.

In the laboratory experiment, methane production was substantially reduced through recycling. Additionally, low methane production in the laboratory reactor was also probably a consequence of the exceptional hydrogen recovery achieved by using the vacuum pump to lower permeate hydrogen pressure, thereby increasing the effectiveness of the membrane. For example, in the laboratory reactor system, about 94% of the hydrogen produced in the reforming reactor passed through to the permeate side of the hydrogen membrane whereas the computer simulation, with a 6:1 retentate recycle ratio, predicted that only 76.3% of the hydrogen produced would pass through the membrane.

The results obtained with the laboratory reforming reactor system were in excellent agreement with the model simulations (see Table 3 below). Thus the computer simulation developed can be used to predict actual yields of hydrogen in the system of the present invention.

TABLE 3

Laboratory Recycle Reactor: TMP, 650° C., 800 kPa, 2.5 Steam/Feed Carbon

| Composition of Products Exiting Reactor System**, Excluding Water | Computer Model 6:1 Recycle (mole %, dry basis) | Laboratory 6:1 Recycle (mole %, dry basis) |
|---|---|---|
| Carbon Monoxide | 1.6% | 2.0% |
| Carbon Dioxide | 20.9% | 20.7% |
| Methane | 4.8% | 2.0% |
| Hydrogen | 72.7% | 72.8% |

**Composition reported in Table 3 is the mole percentage of products by combining the exhaust tail gas stream and purified hydrogen stream.

Example 5

Additional computer simulations were developed using the PRO/II steady state low-sheeting and process optimization software previously described to obtain heat-balanced estimates for the effects of recycle of the retentate stream on the hydrogen production efficiency of the integrated fuel cell system. Example 1 suggests that efficiencies of the integrated fuel cell system for producing hydrogen could approach 90% based on lower heating values. Examples 3 and 4 demonstrate the potential to achieve high yields of hydrogen at moderate reaction temperatures and pressures by recycling a portion of the retentate stream. This example demonstrates the potential of the integrated fuel cell system for achieving high thermal efficiencies.

Figure 9:
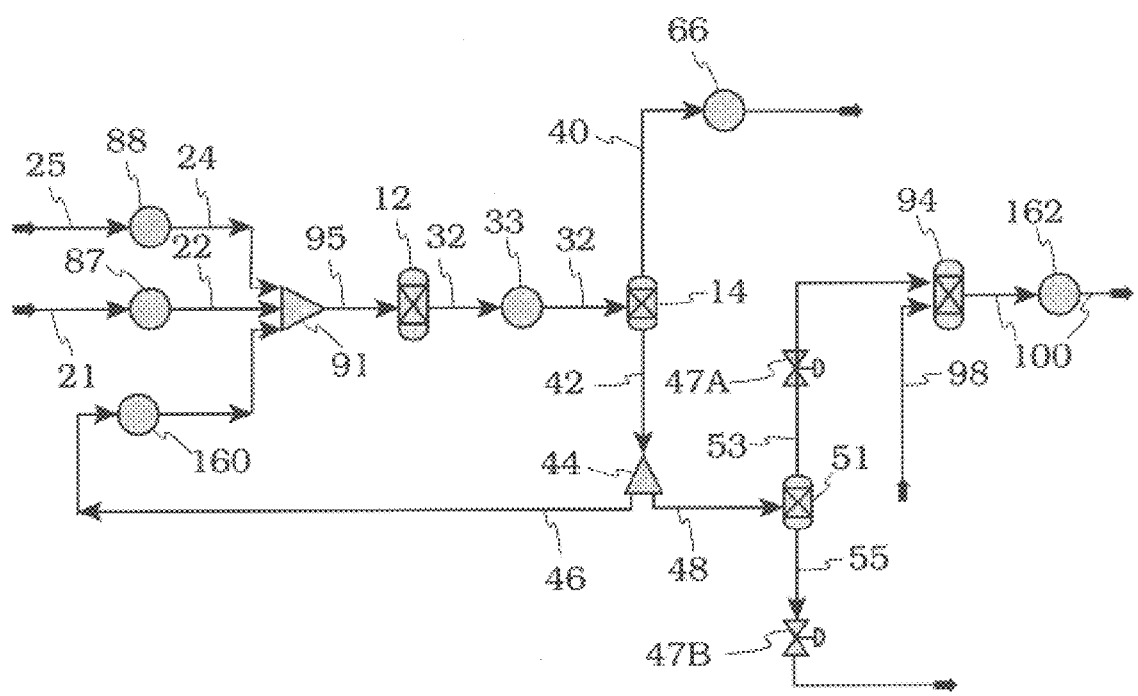
FIG. 9 is a schematic representation of a reforming reactor system used to perform the computer simulations in Examples 5 and 6.

The simulation assumed a reforming reactor system as shown in FIG. 9, including a reforming reactor 12, a hydrogen separating membrane 14, combustor 94 for combusting dry exhaust tail gas stream 53, water vaporizer 88, hydrocarbon vaporizer 87, retentate recycle stream heater 160, condenser 51, and heat exchangers 33, 66, and 162 as shown in FIG. 9. Additionally, the simulation assumed that all streams exiting (i.e., purified hydrogen stream 40, combustion exhaust stream 100, and exhaust tail gas process water 55) and entering the reforming reactor system (i.e., water stream 25 and hydrocarbon feed stream 21) were at 25° C. and 100 kPa.

With respect to the reforming reactor, the reforming reactor was assumed to convert all the hydrocarbon feed of TMP. The simulation also assumed that the operating reforming reaction temperature was 650° C., the operating reforming reaction pressure was 2000 kPa pressure, and the steam to feed carbon ratio was 3:1.

The hydrogen separating membrane was assumed to operate at the operating reaction temperature without heat loss. However, the hydrogen flux calculation through the membrane was adjusted to reflect data obtained at 400° C. using an integrating adaptation of Severt's Law disclosed in Catalysis Today Vol. 25, pp. 303–307 (1995). The hydrogen separating membrane area was set to obtain a nominal 50 kPa hydrogen pressure difference between the retentate side and permeate side at a retentate recycle ratio of 10:1 (retentate recycle stream: exhaust tail gas stream).

With respect to the combustor, the combustor was assumed to operate adiabatically using 10% molar excess air based on the amount of air needed to completely combust all combustibles in the dry exhaust tail gas stream 53. The combustor was also assumed to completely combust all gases in the dry exhaust tail gas stream 53.

The net heat release in the reforming reactor system was determined from the cooling of all products exiting the reforming reactor system to 25° C., including that from cooling the purified hydrogen stream 40, and the exothermic duty available from the combustor. The endothermic thermal duty of the reforming reactor was then compared with the net heat release in the reforming reactor system.

Figure 5:
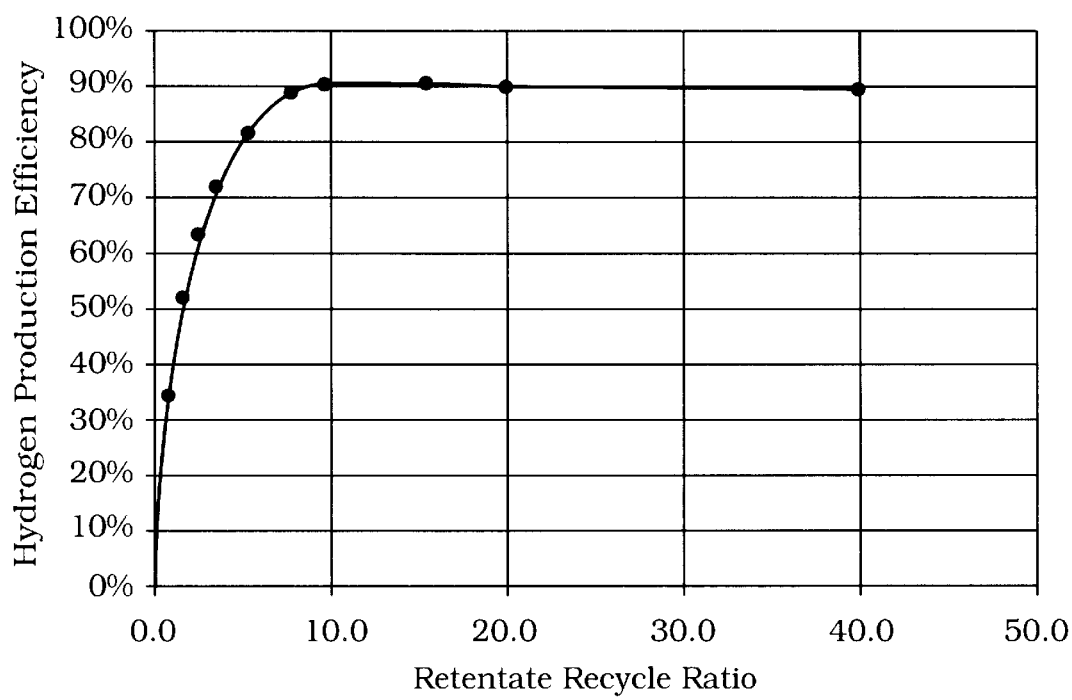
FIG. 5 is a graph showing the effect of retentate recycle ratio on hydrogen production efficiency assuming a reforming reaction temperature of 650° C., a reforming reaction pressure of 2000 kPa, and a steam to feed carbon ratio of 3:1.

FIG. 5 shows the simulation results with respect to the effect of retentate recycle ratio (moles of retentate recycle stream to moles of exhaust tail gas stream) on hydrogen production efficiency (expressed as the LHV of hydrogen in the permeate stream divided by the LHV of the TMP fed to the system). Increasing the retentate recycle ratio significantly improved the hydrogen production efficiency. When the retentate recycle ratio was initiated, hydrogen production efficiency increased from 33%, without recycle, to 52% with a retentate recycle ratio of about 1:1. The hydrogen production efficiency increases rapidly with increasing retentate recycle ratios to about an efficiency of 90% (the autothermal efficiency calculated in Example 1) at a retentate recycle ratio of 10:1. Increasing the retentate recycle ratio further to 20:1 leads to a nearly constant hydrogen production efficiency.

Figure 6:
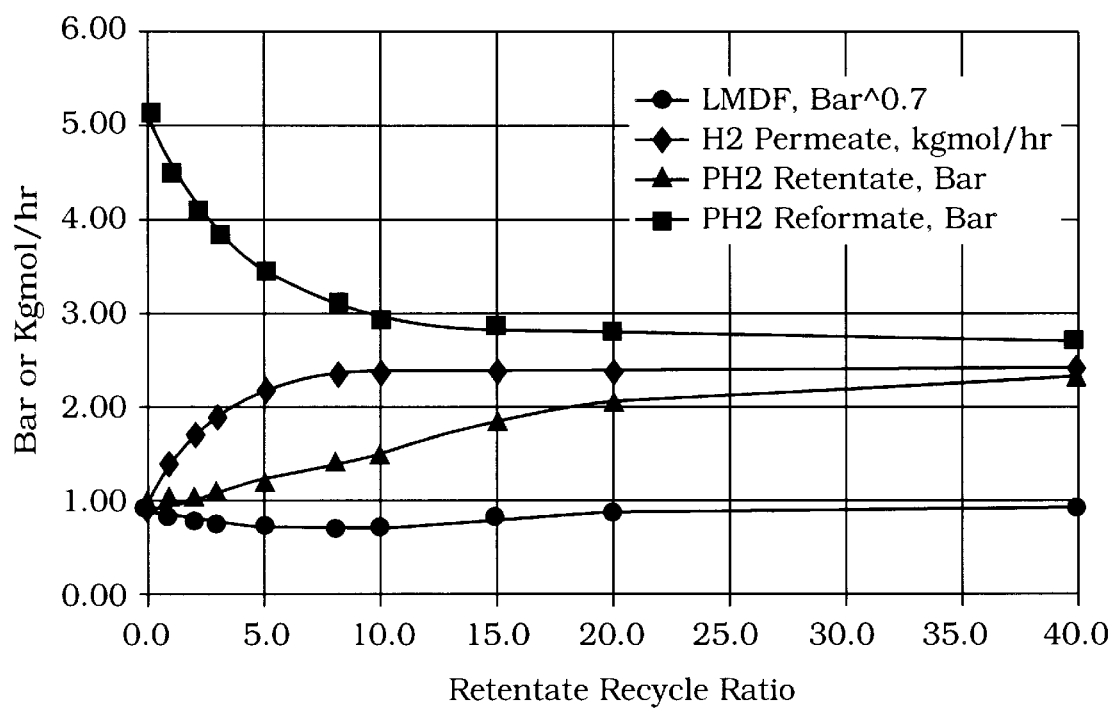
FIG. 6 is a graph showing the effect of retentate recycle ratio on (a) the hydrogen partial pressure driving force across the hydrogen separating membrane (expressed as the Log Mean Driving Force or "LMDF", in Bar raised to the 0.7 power); (b) the rate of hydrogen permeate production ("H2 Permeate", in kgmol/hour); (c) the partial pressure of hydrogen in the retentate stream ("PH2 Retentate", in Bar); and (d) the partial pressure of hydrogen in the reformate stream ("PH2 Reformate", in Bar).

The substantial improvements in efficiency calculated at moderately low retentate recycle ratios (e.g., at or below 20:1) were unexpected based on the hydrogen partial pressure driving force across the hydrogen separating membrane. For example, FIG. 6 shows the effect of retentate recycle ratio on (a) the hydrogen partial pressure driving force across the hydrogen separating membrane (expressed as the Log Mean Driving Force or "LMDF", in Bar raised to the 0.7 power); (b) the rate of hydrogen permeate production ("H2 Permeate", in kgmol/hour); (c) the partial pressure of hydrogen in the retentate stream ("PH2 Retentate", in Bar); and (d) the partial pressure of hydrogen in the reformate stream ("PH2 Reformate", in Bar). FIG. 6 demonstrates that the rate of hydrogen production, as indicated by H2Permeate, PH2 Retentate and PH2 Reformate, is actually the greatest when the LMDF is at about its minimum. The LMDF is calculated by taking the log mean difference of the partial pressure of hydrogen in the reformate stream and the partial pressure of hydrogen in the retentate stream and raising this value to the 0.7 power and subtracting the hydrogen partial pressure in the permeate raised to the 0.7 power.

Figure 7A:
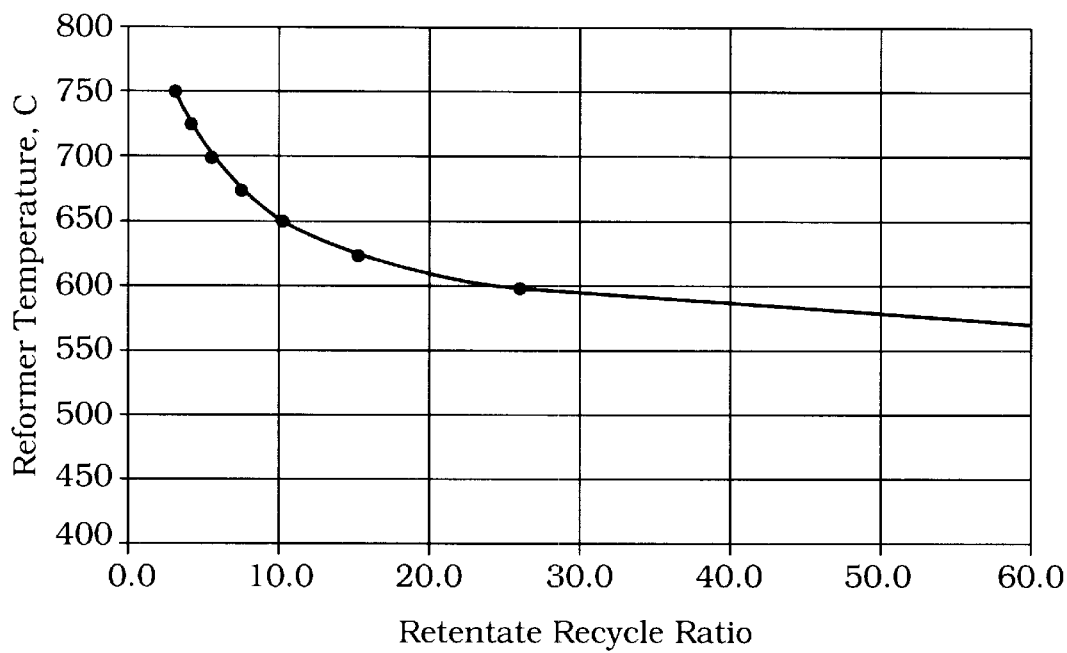
FIG. 7A is a graph showing the effect of retentate recycle ratio on reforming reaction temperature (° C.) when maintaining the hydrogen production efficiency at 90%.
Figure 7B:
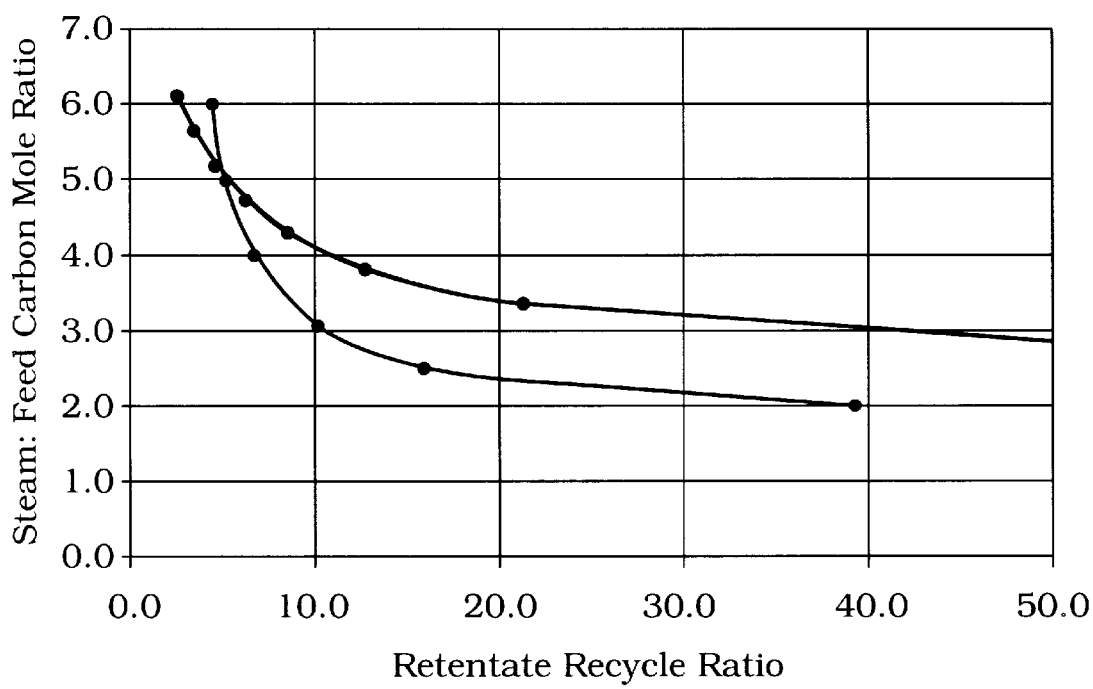
FIG. 7B is a graph showing the effect of retentate recycle ratio on the steam to feed carbon molar ratio when maintaining the hydrogen production efficiency at 90%.

Other simulations were run, assuming the reactor system in FIG. 9, to illustrate how adjusting the retentate recycle ratio can permit one to operate at lower reforming reaction temperatures and steam to feed carbon molar ratios at a constant hydrogen production efficiency. FIG. 7A shows the relationship of reforming reaction temperature versus retentate recycle ratio, assuming a hydrogen production efficiency of 90%. FIG. 7B shows the relationship of molar steam to feed carbon ratio versus retentate recycle ratio assuming a hydrogen production efficiency of 90%. As can be seen in FIG. 7A, moderate operating reaction temperatures, from 600° C. to 750° C. can be achieved by varying the retentate recycle ratio. Similar trends were noted in FIG. 7B with the molar steam to feed carbon ratio.

Example 6

The simulation of Example 5 was again run assuming a reactor system configuration as shown in FIG. 9. In this example, the overall system efficiency, the hydrogen production efficiency, mole fraction of hydrogen in the purified hydrogen stream to the moles of carbon in the hydrocarbon feed, and water recovery were calculated from the simulation. Two simulation conditions were run. In Simulation A, the purified hydrogen stream 40 and exhaust tail gas stream process water 55 were assumed to exit the system at 80° C., and the combustion exhaust gas stream 100 was assumed to exit the system at 300° C. The exhaust tail gas process water was assumed to be condensed at a pressure of about 2000 kPa. In Simulation B, the conditions in Simulation A were assumed and parasitic electrical loads for pumps, compressors and other auxiliary electrical equipment needed to run the system were accounted for, along with typical heat losses associated with typical heat exchange equipment. The results of Simulation A and Simulation B are shown in Table 5 in comparison to the simulation performed in Example 5 where it was assumed all process heat was recovered and that no heat losses occurred.

TABLE 4

System Simulations: TMP, 650° C., 2000 kPa, 3.0 Steam/Feed Carbon Ratio

|  | Example 5 | Example 6 Simulation A | Example 6 Simulation B |
|---|---|---|---|
| Overall System Efficiency, % (kWe/kW HC LHV) | 45 | 40 | 35.2 |
| Hydrogen Production Efficiency, % | 89.4 | 79.9 | 70.2 |
| H$_2$/Carbon, mole ratio | 2.36 | 2.11 | 1.85 |
| Retentate Recycle Ratio, molar | 10.2 | 4.8 | 3.0 |
| Process Water Recovery, % | 45.1 | 48.7 | 53.5 |

In Table 4, overall system efficiency was calculated assuming that the fuel cell would operate at 50% efficiency and was thus determined by dividing the net electrical power produced (i.e., 50% of the LHV of hydrogen in the purified hydrogen stream, converted to electrical energy) by the LHV of the total hydrocarbon feed. The hydrogen production efficiency was calculated as in Example 1. The H$_2$/Carbon mole ratio was determined by dividing the number of mole of hydrogen in the purified hydrogen stream by the moles of carbon in the hydrocarbon feed. The Process Water Recovery was determined by dividing the moles of water in the exhaust tail gas process water stream 55 by the moles of water in water stream 25 and multiplying by 100.

As shown in Table 4, excellent recovery of the exhaust tail gas process water 55 was achieved through condensing the exhaust tail gas stream under pressure. Although the overall system efficiency decreased as heat losses and imperfect heat recovery were assumed, the integrated fuel cell system of the present invention is still expected to operate at overall system efficiencies of 35%. This overall system efficiency is considerably higher than that obtained in conventional gasoline powered internal combustion engines.

There have thus been described certain preferred embodiments of the integrated fuel cell system and method for producing and supplying hydrogen to a fuel cell. While preferred embodiments have been disclosed and described, it will be recognized by those with skill in the art that variations and modifications are within the true spirit and scope of the invention. The appended claims are intended to cover all such variations and modifications.

What is claimed is:

1. A method for producing hydrogen for use in a fuel cell system comprising:
   a) providing a reactor having an inlet and an outlet and a reforming reaction zone containing a reforming catalyst;
   b) feeding a hydrocarbon stream and water stream into the reforming reaction zone wherein the hydrocarbon stream and water stream are vaporized prior to or upon entering the reforming reaction zone of the reactor;
   c) reacting the vaporized hydrocarbon stream and water stream in the reforming reaction zone at a temperature of at least about 200° C. and a pressure of at least 100 kPa to produce a gaseous reformate stream containing hydrogen;
   d) directing the gaseous reformate stream into a hydrogen separating membrane to form a purified hydrogen stream and a retentate stream;
   e) forming a retentate recycle stream and an exhaust tail gas stream from the retentate stream in proportions to provide a retentate recycle ratio of about 1:20 to about 20:1;
   f) recycling the retentate recycle stream to the reforming reaction zone and directing the exhaust tail gas stream to a combustor; and
   h) oxidizing the exhaust tail gas stream in the combustor in the presence of oxygen to form a combustion gas stream and heat, and transferring at least a portion of the heat formed to the reforming reactionzone, the hydrocarbon stream, the water stream, or the retentate recycle stream, or combinations thereof.

2. The method of claim 1 wherein the oxidation is conducted in the presence of an oxidation catalyst.

3. The method of claim 1 wherein the reforming catalyst is selected from the group consisting of noble metals.

4. The method of claim I further comprising the steps of:
   a) directing the purified hydrogen stream and air into a fuel cell to produce electrical energy and a fuel cell exhaust stream comprising water vapor and oxygen depleted air; and b) separating the water vapor from the oxygen depleted air and feeding at least a portion of the oxygen depleted air stream into the combustor.

5. The method of claim 4 wherein the combustor has one or more combustion zones for oxidizing the exhaust tail gas stream, wherein the combustion zones are located within the reforming reaction zone and are separated from the reforming reaction zone by one or more surfaces.

6. The method of claim 4 further comprising the step of recycling to the reforming reaction zone at least a portion of the water vapor from the fuel cell exhaust stream, or water vapor from the exhaust tail gas stream, or combinations thereof.

7. The method of claim 4 further comprising the step of cooling the reformate stream prior to the directing of the reformate stream into the hydrogen separating membrane, cooling the purified hydrogen stream prior to the directing of the purified hydrogen stream into the fuel cell, or cooling the exhaust tail gas stream prior to the directing of the exhaust tail gas stream into the combustor, or combinations thereof.

8. The method of claim 7 further comprising the step of transferring the heat released from the cooling of the reformate stream, the purified hydrogen stream, or the exhaust tail gas stream, or combinations thereof to heat the oxygen depleted air stream, water vapor recycled from the exhaust tail gas stream, or the fuel cell exhaust stream, or combinations thereof.

9. The method of claim 4 wherein the combustion gas stream or exhaust tail gas stream or combinations thereof is expanded to release energy and the energy released is used to operate blowers, turbines, or pumps, or combinations thereof located in the fuel cell system.

10. The method of claim 4 further comprising the step of supplying the electrical energy generated from the fuel cell to a vehicle, or stationary structure.

11. An integrated system for producing and supplying hydrogen to a fuel cell comprising:

(a) a reforming reactor having an inlet, an outlet, a reforming reaction zone for reacting a vaporized hydrocarbon stream and a vaporized water stream to produce a reformate stream containing hydrogen, and a reforming catalyst located in the reforming reaction zone;

(b) a hydrogen separating membrane for separating from the reformate stream a purified hydrogen stream and a retentate stream, wherein the membrane has an inlet in flow communication with the outlet of the reforming reactor, a retentate side for discharging the retentate stream, and a permeate side for discharging the purified hydrogen stream;

(c) retentate recycle means for forming the retentate stream into a retentate recycle stream and an exhaust tail gas stream, and for directing the retentate recycle stream to the reforming reaction zone, wherein the retentate recycle means provides for a retentate recycle ratio of from about 1:20 to about 20:1;

(d) a combustor having an inlet for receiving the exhaust tail gas stream and an outlet for exhausting a combustion gas stream, and capable of oxidizing the exhaust tail gas stream to generate heat and the combustion gas stream; and (e) heat transfer means for transferring at least a portion of the heat formed in the combustor to the reforming reaction zone, the hydrocarbon stream, the water stream, or the retentate recycle stream or combinations thereof.

12. The system of claim 11 further comprising:

(a) a fuel cell having a first inlet for receiving the purified hydrogen stream, a second inlet for receiving air, and an outlet for removing a fuel cell exhaust containing oxygen depleted air and water vapor; and (b) fuel cell exhaust separating means for separating the water vapor from the oxygen depleted air and directing the oxygen depleted air to the inlet of the combustor.

13. The system of claim 12 wherein the combustor comprises one or more conduits that are located within the reforming reaction zone for combusting the exhaust tail gas stream.

14. The system of claim 12 further comprising cooling means for cooling the reformate stream, the purified hydrogen stream, or the exhaust tail gas stream, or combinations thereof.

15. The system of claim 12 further comprising a condenser for condensing water in the exhaust tail gas stream and a back pressure device for maintaining the pressure of the exhaust tail gas stream exiting the condenser at pressures ranging from about 100 kPa to about the operating pressures in the reforming reactor.

16. The system of claim 12 further comprising water recycle means for directing to the reforming reactor the water vapor from the fuel cell exhaust stream or water vapor from the exhaust tail gas stream, or combinations thereof.

17. The system of claim 16 further comprising means for transferring heat removed by the cooling means to the water vapor being recycled to the reforming reactor.

18. The system of claim 12 further comprising means for expanding the exhaust tail gas stream or combustion gas stream or combinations thereof to produce energy, and transferring at least a portion of the energy to the integrated system.

* * * * *